US012645354B2

(12) United States Patent
Kaptelinin

(10) Patent No.: US 12,645,354 B2
(45) Date of Patent: *Jun. 2, 2026

(54) INERTIAL SCROLLING METHOD AND APPARATUS

(71) Applicant: Viktor Kaptelinin, Hornefors (SE)

(72) Inventor: Viktor Kaptelinin, Hornefors (SE)

( * ) Notice: Subject to any disclaimer, the term of this patent is extended or adjusted under 35 U.S.C. 154(b) by 0 days.

This patent is subject to a terminal disclaimer.

(21) Appl. No.: 19/300,696

(22) Filed: Aug. 15, 2025

(65) Prior Publication Data

US 2025/0377779 A1     Dec. 11, 2025

Related U.S. Application Data

(63) Continuation-in-part of application No. 18/084,717, filed on Dec. 20, 2022, now Pat. No. 12,399,610, which is a continuation-in-part of application No. 17/355,067, filed on Jun. 22, 2021, now abandoned.

(60) Provisional application No. 63/042,349, filed on Jun. 22, 2020.

(51) Int. Cl.
*G06F 3/0485* (2022.01)
*G06F 3/04842* (2022.01)

(52) U.S. Cl.
CPC ........ *G06F 3/0485* (2013.01); *G06F 3/04842* (2013.01)

(58) Field of Classification Search
CPC .......................... G06F 3/0485; G06F 3/04842
See application file for complete search history.

(56) References Cited

U.S. PATENT DOCUMENTS

| | | |
|---|---|---|
| 7,770,130 B1 | 8/2010 | Kaptelinin |
| 8,209,606 B2 | 6/2012 | Ording |
| 8,341,546 B2 | 12/2012 | Winter |

(Continued)

OTHER PUBLICATIONS

Baglioni, M., Malacria, S., Lecolinet, E., and Guiard, Y.2011. Flick-and-brake: finger control over inertial/ sustained scroll motion. In CHI '11 Extended Abstracts on Human Factors in Computing Systems (CHI EA '11). Association for Computing Machinery, New York, NY, USA, 2281-2286. https://doi.org/10.1145/1979742. 1979853.

(Continued)

*Primary Examiner* — Muhammad N Edun

(57) ABSTRACT

An inertial scrolling method and apparatus limit scrolling distance based on a user's interaction location. An electronic device includes a processor, memory, display, and scrolling input device, which may be a touch-sensitive display or a separate device such as a touch pad. In break-contact embodiments, an initial window location is determined at the moment the user disengages from the input device; in establish-contact embodiments, it is determined when the user first engages, with the corresponding document area retrospectively designated as an initial pointed document area if inertial scrolling follows. During inertial scrolling, the scrolling distance is limited to substantially the distance between the initial window location (or the window location of the initial pointed document area) and a border of the display window in the scrolling direction. Some embodiments highlight the initial pointed document area during scrolling. The invention improves scrolling precision and user control across diverse input modalities.

20 Claims, 12 Drawing Sheets

(56)                    References Cited

U.S. PATENT DOCUMENTS

| | | | |
|---|---|---|---|
| 8,910,073 B2 | 12/2014 | Mercer | |
| 9,081,496 B2 | 7/2015 | Cho | |
| 9,182,897 B2 | 11/2015 | Rogers | |
| 9,395,905 B2 | 7/2016 | Wherry | |
| 11,397,782 B2* | 7/2022 | Jiang | G06F 16/9535 |
| 2002/0030667 A1 | 3/2002 | Hinckley | |
| 2008/0220747 A1 | 9/2008 | Ashkenazi | |
| 2011/0001709 A1 | 1/2011 | Wang | |
| 2012/0174005 A1 | 7/2012 | Deutsch | |
| 2013/0063384 A1* | 3/2013 | Ito | G06F 3/0485 |
| | | | 345/173 |
| 2013/0111396 A1 | 5/2013 | Brid | |
| 2014/0351746 A1 | 11/2014 | Evans | |
| 2016/0034126 A1 | 2/2016 | Kaptelinin | |
| 2018/0300035 A1 | 10/2018 | Kaptelinin | |
| 2018/0307393 A1 | 10/2018 | Clark | |
| 2019/0025997 A1* | 1/2019 | Nishio | G06F 3/14 |
| 2023/0130520 A1 | 4/2023 | Kaptelinin | |

OTHER PUBLICATIONS

Aliakseyeu, D., Irani, P., Lucero, A., and Subramanian, S. 2008. Multi-flick: an evaluation of flick-based scrolling techniques for pen interfaces. In Proceedings of the SIGCHI Conference on Human Factors in Computing Systems (CHI '08). Association for Computing Machinery, New York, NY, USA, 1689-1698. https://doi.org/10.1145/1357054.1357319.

Son, S., Jung, J., Ham, A., and Lee, G. 2023. TouchWheel: Enabling Flick-and-Stop Interaction on the Mouse Wheel. International Journal of Human-Computer Interaction, 40(13), 3539-3551. https://doi.org/10.1080/10447318.2023.2190259.

* cited by examiner

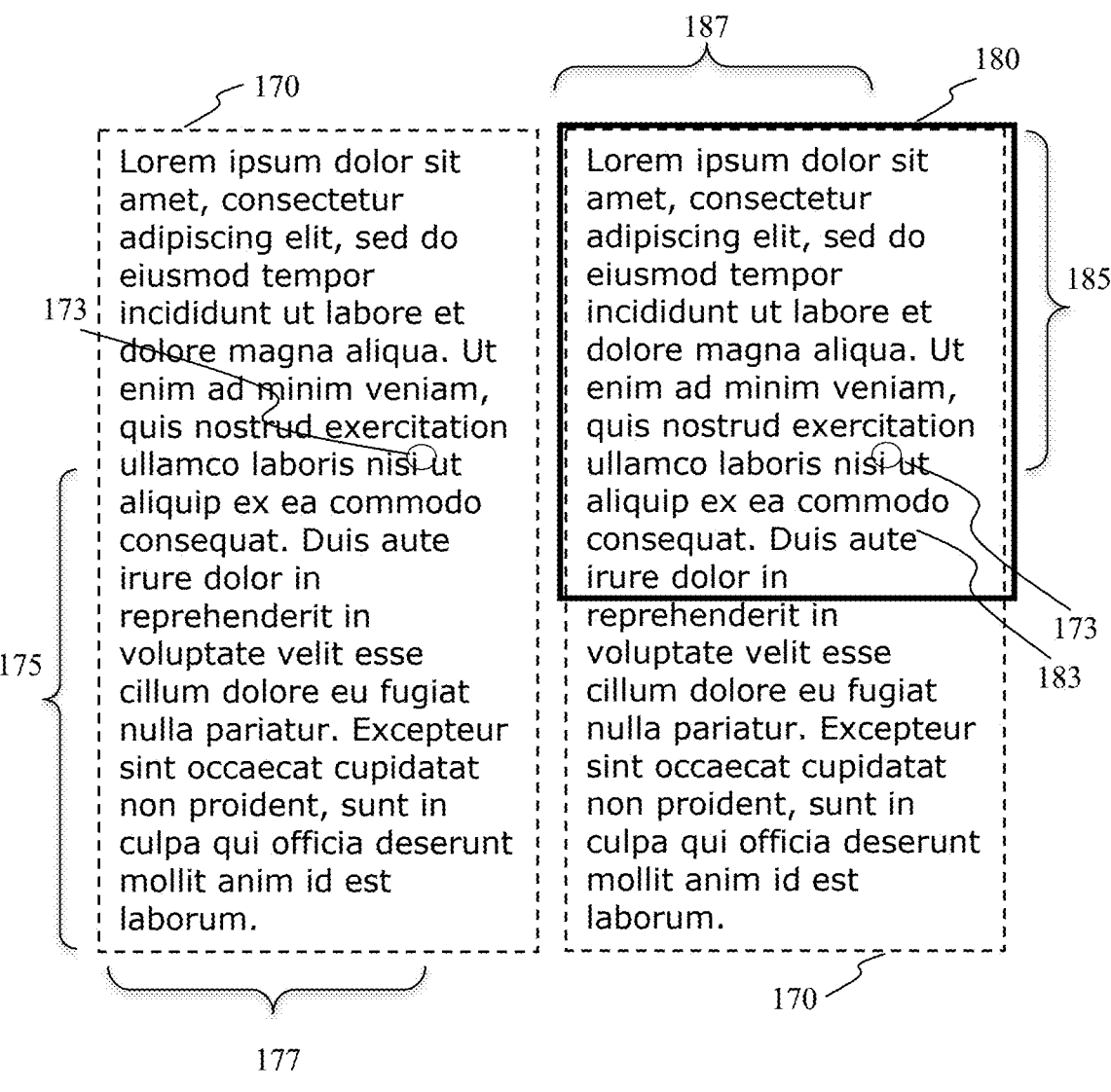
Figure 1a         Figure 1b

240

225

200

210

220

250

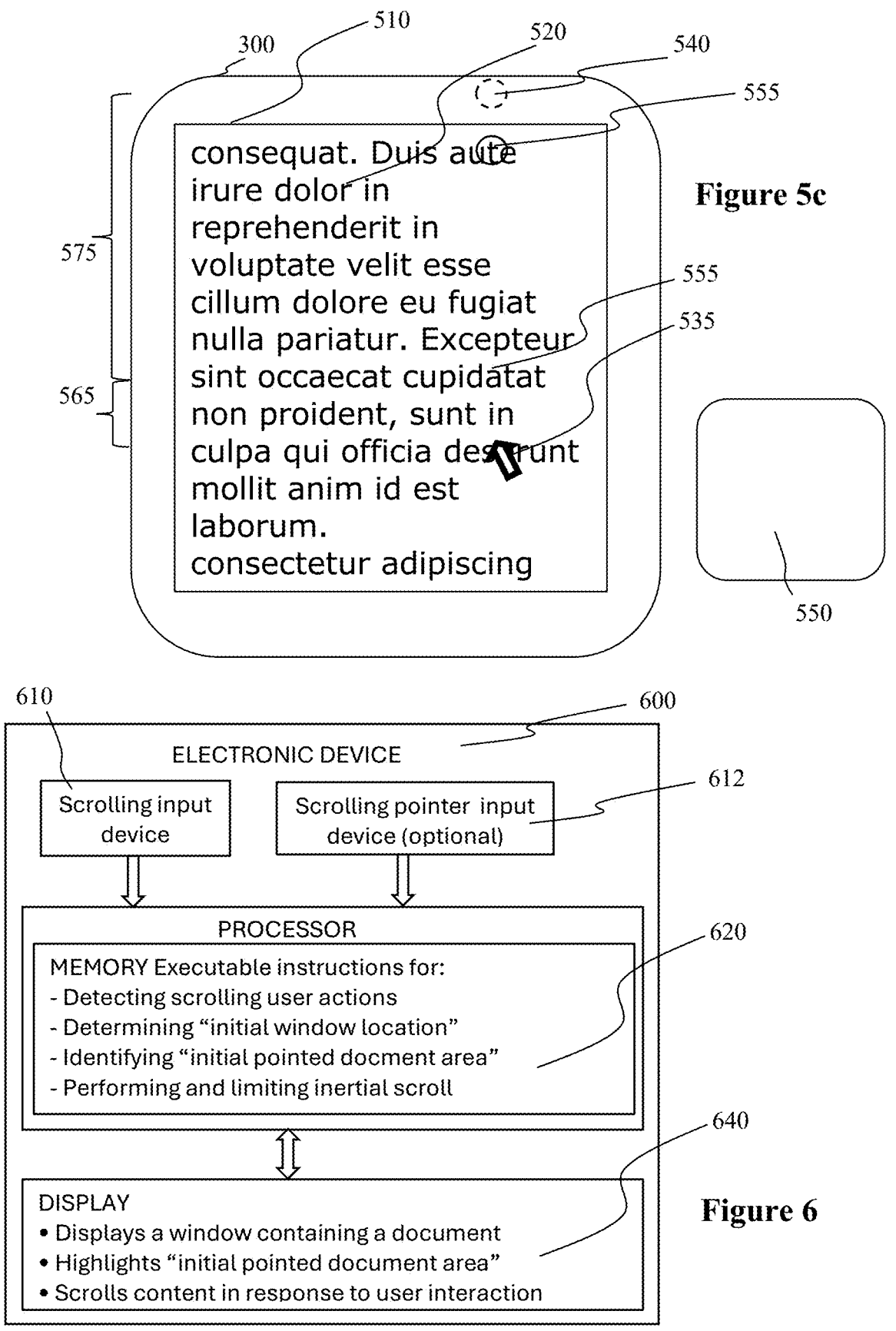

Figure 5c

ELECTRONIC DEVICE

Scrolling input device

Scrolling pointer input device (optional)

PROCESSOR

MEMORY Executable instructions for:
- Detecting scrolling user actions
- Determining "initial window location"
- Identifying "initial pointed docment area"
- Performing and limiting inertial scroll

DISPLAY
- Displays a window containing a document
- Highlights "initial pointed document area"
- Scrolls content in response to user interaction

Figure 6 consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.
consectetur adipiscing

INERTIAL SCROLLING METHOD AND APPARATUS

CROSS-REFERENCE TO RELATED APPLICATIONS

This application is a Continuation-in-Part of U.S. patent application Ser. No. 18/084,717, filed Dec. 20, 2022, with title "INERTIAL SCROLLING METHOD AND APPARA-TUS" and naming Viktor Kaptelinin as inventor, which is itself a Continuation-in-Part of U.S. patent application Ser. No. 17/355,067, filed Jun. 22, 2021, with title "INERTIAL SCROLLING METHOD AND APPARATUS" and naming Viktor Kaptelinin as inventor, which claims the benefit of provisional U.S. Patent Application No. 63/042,349, filed Jun. 22, 2020, with title "KINETIC SCROLLING METHOD AND APPARATUS" and naming Viktor Kapte-linin as inventor. All of the foregoing applications are hereby incorporated herein by reference in their entirety.

Portions of the present application correspond to subject matter disclosed in U.S. application Ser. No. 18/084,717, filed December 20, by the same inventor. While the parent application Ser. No. 18/084,717 only claims the "initial window location" and the "initial pointed document area" as being determined at break-contact, particularly in touch-screen systems, it also discloses—but does not claim—determining the "initial pointed document area" at establish-contact, particularly in screen pointer-based systems. In this CIP, subject matter is disclosed, and claims are presented, to cover both approaches. In particular, FIG. 4 and the accom-panying description are based on the "establish-contact" subject matter, which was disclosed in the parent application but was not previously claimed. In this Continuation-in-Part application, this subject matter is relied upon and newly claimed for the first time.

NOTICE REGARDING SCOPE OF PARENT APPLICATION

This filing is not intended to and should not be construed as a disclaimer or limitation of the scope or content of U.S. patent application Ser. No. 18/084,717. The claims of the parent application stand on their own merit.

FEDERALLY SPONSORED RESEARCH

Not Applicable

BACKGROUND OF THE INVENTION

The invention relates to user interfaces of electronic devices having displays, such as desktop computers, laptop computers, tablet computers, smartphones, electronic bookreaders, car dashboards, control panels of industrial equipment and home appliances, display components of self-service technologies, and so forth.

Electronic devices often comprise displays (or "screens") displaying various types of content. The content is typically displayed in windows. In the context of this invention the term "window" (or "display window") is understood in a broad sense, as a content viewing area of a display of any type.

Only a portion of a window-related content may be displayed in a window, and the user may be enabled to scroll the content, that is, make the displayed content move across the window, to see other portions of the content (a "docu-ment"). One particular type of scrolling is "inertial scrolling" (or "kinetic scrolling"), which is a scrolling that con-tinues after the user completes the scrolling user action. For instance, the user may (a) move a finger across a touch sensitive display ("touchscreen") in a linear fashion, causing the window content to move in the same direction, and with approximately the same speed, as the movement of the finger, and then (b) abruptly break the contact between the finger with the display. As a result, the content displayed on the touch sensitive display may continue to scroll further for an additional distance, even though the user stops perform-ing any user actions with the display. Inertial/kinetic scroll-ing may be also achieved by performing a scrolling action, similar to the one described above, with a separate input device, such as touch pad or scroll wheel. Inertial/kinetic scrolling is commonly implemented so that the scrolling slows down, and eventually stops, after the user breaks contact with the display.

A problem with inertial scrolling is that it may be impre-cise. For instance, it may be difficult for a smartphone user to make a content scroll for exactly the desired distance after the user breaks contact with the smartphone display. This problem is addressed in the present invention.

SUMMARY OF THE INVENTION

The present invention teaches inertial scrolling method and apparatus, according to which the distance, for which the content of a display window scrolls as a result of an inertial scrolling user action, is substantially determined by the window location, which is touched, or pointed at, by the user. According to break-contact embodiments, the distance of an inertial scrolling is substantially limited by the distance between (a) an "initial window location" determined as a break-contact window location, that is, the location, which is touched, or pointed at, by the user when breaking contact with a scrolling input device (such as the location of a touch-sensitive display contacted by a user immediately before the user breaks contact with the display to initiate an inertial scrolling, or the location of screen pointer at a moment when the user breaks contact with a touch pad and an inertial scrolling is initiated) and (b) the border of the window in the direction of the scrolling. According to establish-contact embodiments, the document area, dis-played in proximity of "initial window location", deter-mined as the location of a user's engagement with the input device (such as the location of the screen pointer at the moment of user's initial contact with the touch pad when performing an action resulting in inertial scrolling), is des-ignated as an "initial pointed document area" if the engage-ment is followed by a break-contact and inertial scrolling. The distance of inertial scrolling is substantially limited to the distance between (a) the window location of "initial pointed document area" at the break-contact moment and (b) the border of the window in the direction of the scrolling.

In particular, a method is disclosed for assisting a user of an electronic device in viewing information on said elec-tronic device, said electronic device having at least a pro-cessor, a memory storage storing computer-executable instructions, a display having an at least a window display-ing a portion of a document, and a scrolling input device, said method comprising the method steps of displaying a first portion of said document in said display window; and detecting an inertial scrolling user action, which scrolling user action detecting comprises at least detecting a direction of said inertial scrolling action and detecting an "initial window location", wherein said "initial window location" is a location of said display window, contacted, or pointed at, by the user at break-contact; and scrolling said document to display a second portion of said document in said display window, while limiting a distance of said document scrolling to substantially a distance between said "initial window location" and a border of said display window in the direction of said inertial scrolling.

According to one embodiment of the invention, the method further comprises the steps of detecting an "initial pointed document area," said "initial pointed document area" being a document image area, displayed substantially in proximity of a break-contact location;

scrolling said document in the direction of said inertial scrolling; and highlighting said "initial pointed document area" during said inertial scrolling.

According to another embodiment, visual attributes of said highlighted "initial pointed document area" change when said highlighted "initial pointed document area" reaches a border of said display window in the direction of said inertial scrolling.

According to yet another embodiment, said electronic device comprises a touch-sensitive display, said touch-sensitive display being a display, at least part of which display serving as a sensing input device, and said "initial window location" being a location of said touch-sensitive display, which location is contacted by a user immediately before the user breaks contact with the display to initiate an inertial scrolling.

According to one embodiment, said electronic device comprises a separate scrolling input device, said separate device being separate from said display, and said display displays a screen pointer controlled by a user, and wherein said "initial window location" is a location of said screen pointer at a moment when an inertial scrolling is initiated by the user.

According to another embodiment, the method further comprises the steps of:

detecting at least an attribute of an inertial scrolling user action selected from a group comprising at least: speed of the input object, acceleration of the input object, and pressure of input object against the display;

inferring a distance, for which a document displayed in said window would scroll if a distance of said document scrolling were not limited to substantially a distance between said "initial window location" and a border of said display window in the direction of said inertial scrolling;

if said inferred distance is greater than a distance between "initial window location" and a border of said window in a direction of said scrolling, and a difference between said distances is not greater than a first predetermined value, then performing inertial scrolling of said document in said window for a distance substantially equal to a distance between "initial window location" and said border of said window in the direction of said scrolling; and if said inferred distance is greater than a distance between "initial window location" and a border of said window in a direction of said scrolling, and a difference between said distances is greater than the first predetermined value, then performing inertial scrolling of said document in said window for a distance substantially equal to said inferred distance.

One Embodiment Further Comprises the Steps of:

detecting a speed, with which said document scrolls at a moment when said "initial pointed document area" reaches a border of said display window in the direction of said inertial scrolling; and limiting said inertial scrolling to substantially a distance between said "initial window location" and a border of said display window in the direction of said inertial scrolling only if said speed does not exceed a second predetermined value.

According to one embodiment of the invention, the invention is implemented as an apparatus, comprising at least a processor; and a scrolling input device; and a display, adapted to display at least a window adapted to displaying at least a portion of at least a document; and a memory storage storing computer-executable instructions;

wherein said display, said processor, said memory storage, and said computer-executable instructions being adapted to perform the following displaying a first portion of a document in a window displayed on said display;

detecting an inertial scrolling user action, which detecting comprises at least detecting a direction of said inertial scrolling action and detecting an "initial window location", said "initial window location" being an area of said display window pointed at by a user at break-contact;

scrolling said document to display a second portion of said document in said display window; a distance of said document scrolling being limited to substantially a distance between said "initial window location" and a border of said display window in the direction of said inertial scrolling.

According to yet another embodiment, said display is a touch-sensitive display ("touchscreen"), said touch-sensitive display being a display, at least part of which also serves as a scrolling input device, and said processor, said touch-sensitive display, said memory storage, and said computer-executable instructions are further adapted to perform the following detecting a scrolling user action, said action being initiated by touching the display with a scrolling input object, such as a finger; and detecting an "initial window location" as a location of a point of a scrolling input object touch at a moment when the user breaks the contact between the scrolling input object and the display to initiate an inertial scrolling.

According to one embodiment, the invention is implemented as an apparatus, wherein said scrolling input device is a device, separate from said display, and said display is adapted to display a screen pointer in said display window, and said apparatus further comprises a screen pointer input device, said screen pointer input device being adapted to control a screen location of said screen pointer, and said processor, said display, said scrolling input device, screen pointer input device, and said memory storage are adapted to detect an "initial window location" as a break contact location or, alternatively, an establish-contact location.

According to one embodiment, said screen pointer input device is integrated with said scrolling input device.

TERMS USED IN THE PRESENT APPLICATION

Display is a physical device for visual presentation of electronically stored information. The term "display" is understood in a broad sense to cover all types of digital displays that can display information contents, including screens of personal digital artifacts (such as a tablet, smartphone, laptop computer, or desk computer), large-screen wall mounted displays, tabletop displays, embedded system displays (displays of industrial or consumer equipment, including process control systems, self-service technologies, home appliances, etc.), projected displays (images projected on various surfaces), head-mounted displays, smart glasses, and so forth. A display can comprise several monitors (e.g., placed side by side). In the context of the present invention the terms "display" and "screen" are used interchangeably.

Display Window (or Window) is an area of a display, dedicated for displaying its related content (a "document"). Windows may display different types of information objects or sets of information objects, such as texts, pictures, videos, user interface elements (e.g., pop-up or pull-down menus, control panels, sets of tiles or icons, or folder views), and so forth, as well as combinations thereof. A display can show one or several windows, which windows can be of various size, location, and shape. A display may show a window with an area coinciding with the area of the entire display, and a window may display one or more embedded windows. At any given moment of time a window can display only a portion of its related content, and a window-related content may need to be scrolled, that is, moved across the window, for other portions of the content to be displayed. The same window may at different moments be located at different areas of a display.

Window location is the location of a point or an area within a window. Window location of a point can be described in various ways, equivalent in the sense that they can be transformed into each other. For instance, a window location of a point can be defined through window coordinates of the point, such as a pair of values corresponding to, respectively, horizontal and vertical distances from a predetermined "origin", such as one of the corners of the window, to the point. Other coordinate systems, e.g., various Cartesian or polar coordinate systems, can be used. A window location of an area can be defined through window coordinates of one or several points belonging to the area, as well as potential additional parameters. For instance, the window location of a circle can be defined by the coordinates of the center of the circle, as well as the radius of the circle.

If a window does not move relative to a display, then there is 1:1 correspondence between a display location and a window location. If a window at different moments is located at different areas of a display, then the same window location can correspond to different display locations.

Inertial (kinetic) scrolling is a scrolling, which continues after the termination of the scrolling user action, causing the scrolling. Inertial scrolling may be caused, for instance, by a flicking gesture, when the user first rapidly moves an input object (e.g., a finger, fingers, or stylus) across the surface of an input device (e.g., a touchscreen or a touch pad), while maintaining contact with the surface, and then abruptly breaks contact with the surface. Inertial scrolling may be implemented so that the scrolled content slows down over time and eventually stops.

Inertial scrolling may involve two types of scrolling user actions. When performing a pre-inertial scrolling user action, the user is engaged (even if briefly) with a window content, causing the content move, as if applying force to give the content kinetic energy. It is followed by an inertial scrolling user action when the user disengages from the scrolled content (e.g., breaks contact with a touchscreen) and the content continues to scroll.

"Initial window location" is a window location, which in some embodiments is determined as the window location touched, or pointed at, at break-contact, the disengagement of an input object from an input device (such as the location of a touch-sensitive display contacted by a user immediately before the user breaks contact with the display to initiate an inertial scrolling). In other embodiments, "initial window location" is determined as an establish-contact window location, that is, window location of user's engagement with the input device (for instance, the location of a screen pointer at a moment of user's initial contact with an input device at the beginning of a gesture resulting in an inertial scrolling).

"Initial pointed document area" is a document image area, displayed substantially at an "initial window location" when the "initial window location" is first determined: either at break-contact or, tentatively, at establish-contact. in case of establish-contact embodiments, a candidate "initial pointed document area" becomes an actual "initial pointed document area" if followed by break and momentum-based document motion. When an "initial pointed document area" is first determined, its window location is the same as the "initial window location". At subsequent moments of scrolling, the window location of "initial pointed document area" may change, and other document image areas may be displayed at the "initial window location".

Forcefulness of inertial scrolling user actions is the amount of force characterizing a scrolling user action and determining the amount of perceived kinetic energy received by the scrolled content from the scrolling user action at the pre-inertial phase. The forcefulness of a scrolling user action can be determined by various attributes of the user action, for instance, it may positively correlate with the speed, acceleration, or amplitude of the user gesture performed before breaking contact with the display or touch pad, the amount of pressure exerted by the user on the display or touch pad during a user gesture before breaking contact with the display, or a combination of the attributes thereof. Other indicators of the user effort when performing a scrolling user action (such as the tension of body or facial muscles) can also be used. The forcefulness of a scrolling user action may also depend on the action trajectory, for instance, a linear trajectory may produce a more forceful scrolling action than a non-linear trajectory.

Document image is a visual representation of the entire content related to a window. In the context of the present invention, "document" is understood as the entirety of various information objects (such as texts, pictures, and videos) and/or their combinations, which can be potentially displayed in a certain window. The present invention deals with how documents are displayed, rather than with their meaning and formal structure, so, unless specifically indicated, the term "document" is used below in the sense of "document image."

Document image location is the location of a point or an area of a document image. A document image location can be defined similarly to a window location, but within a coordinate system of a particular document image. Since a document image can move in a window, the same area of a document image can be displayed in different window locations, which is illustrated by FIGS. 1a-1c. The figures show document image 170, which is an image of a text document (FIG. 1a). Document image area 173 is a small circle, generally between the words "nisi" and "ut". A document image location of area 173 is defined by two Cartesian coordinates, corresponding, respectively, to a vertical distance 175 and a horizontal distance 177 between the center of area 173 and the bottom left corner of document image 170 (which corner serves as the origin of a coordinate system for defining document image locations within document image 170).

FIG. 1*b* shows display window 180, displaying document image 170. Document image 170 is too large to be entirely displayed in window 180, and only part 183 of image 170 can be displayed in window 180. Part 183 comprises document image area 173, so that area 174 is displayed in window 180. FIG. 1*b* shows window location of area 173 as defined by two Cartesian coordinates, corresponding, respectively, to a vertical distance 185 and a horizontal distance 187 between the center of area 173 and the top left corner of window 180 (which corner serves as the origin of a coordinate system for defining window locations within window 180).

FIG. 1*c* shows display window 180, displaying document image 170, when image 170 is scrolled four lines of text up in window 180, compared to how image 170 and window 180 are shown in FIG. 1*b*. FIG. 1*c* shows that, while the document image location of area 173 has not changed after the scrolling, the window location of area 173 is different. The vertical scrolling, illustrated by FIGS. 1*b* and 1*c*, changed the vertical window coordinate of area 173 from a value corresponding to distance 185 to a value corresponding to distance 186. No horizontal scrolling was involved, so the horizontal window coordinate of the window location of area 173 has not changed. A vertical scrolling for a longer distance could result in area 173 being not visible in window 180. In that case there would be no window location of area 173 in window 180.

BRIEF DESCRIPTION OF THE DRAWINGS

FIGS. 1*a*-1*c* illustrate the terms "document image", "window location", and "document image location" in the context of the present invention.

FIGS. 5*a*-5*c* illustrate, by way of comparison to the third embodiment shown in FIG. 4, a pointer-based implementation which determines "initial window location", as well as "initial pointed document area", at break-contact and includes using a touch pad.

FIG. 6 is a schematic block diagram of an electronic device according to the present invention, showing principal components for performing inertial scrolling in both break-contact and establish-contact embodiments.

DETAILED DESCRIPTION OF THE INVENTION

Part A: Subject Matter Shared with the Parent Application Editorial Note:

To improve clarity and internal consistency, the present application clarifies and reorders certain portions of the specification compared to the parent application. For example, the description of the second variation of the first embodiment has been placed directly after the first variation, reflecting their conceptual relationship. Figure numbering has been updated accordingly. Additionally, the relationship between the terms "initial window location" and the "initial pointed document area" is explicitly recited at several points below for clarifying the meaning of the terms in the context of the discussed embodiments. The present application also includes corrections of typographical, formatting, and other low-level language issues found in the parent application. The substance of the disclosure remains consistent with the parent.

The subject matter disclosed below relates to assisting a user of an electronic device in viewing information on said electronic device, said electronic device having at least a processor, a memory storage storing computer-executable instructions, a display having an at least a window displaying a portion of a document, and a scrolling input device.

First Embodiment of the Invention

The first embodiment of the invention is illustrated by FIGS. 1*d*-2*b*. The embodiment describes an inertial scrolling of a touchscreen display window content. In FIGS. 1*d*-2*b*, the "initial pointed document area" is shown as the portion of the document that is displayed at "initial window location" when the user breaks contact with the touchscreen. In the context of the first embodiment, "initial window location" is the break-contact location, that is, the window location where the user breaks contact with the touchscreen, starting inertial scrolling.

Figure 1C:
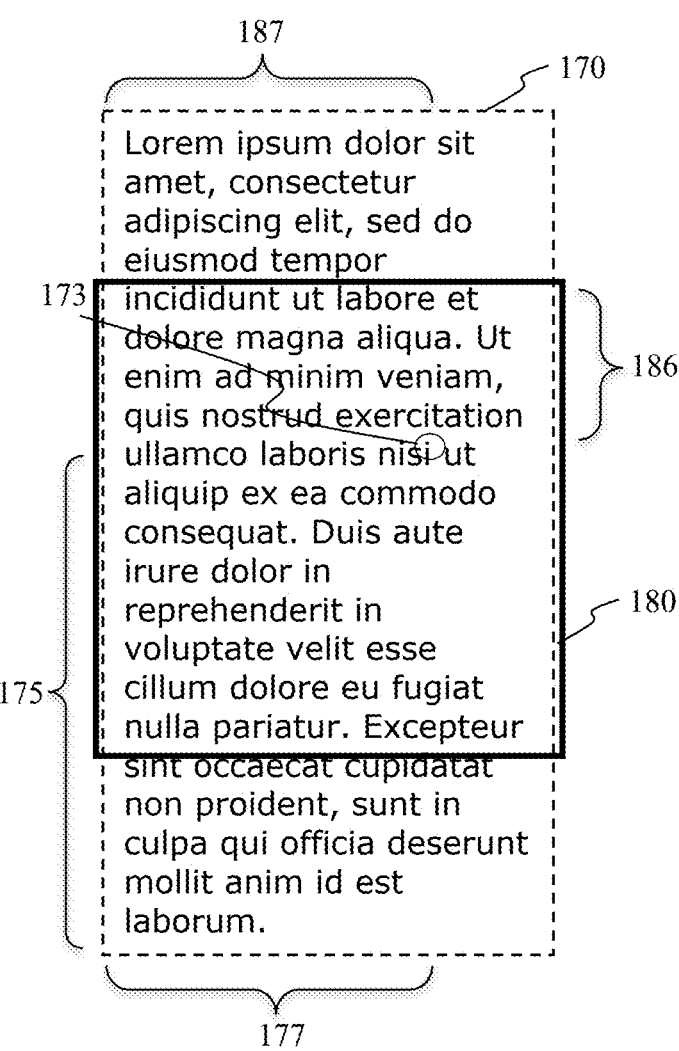
Figures 1D, 1E:
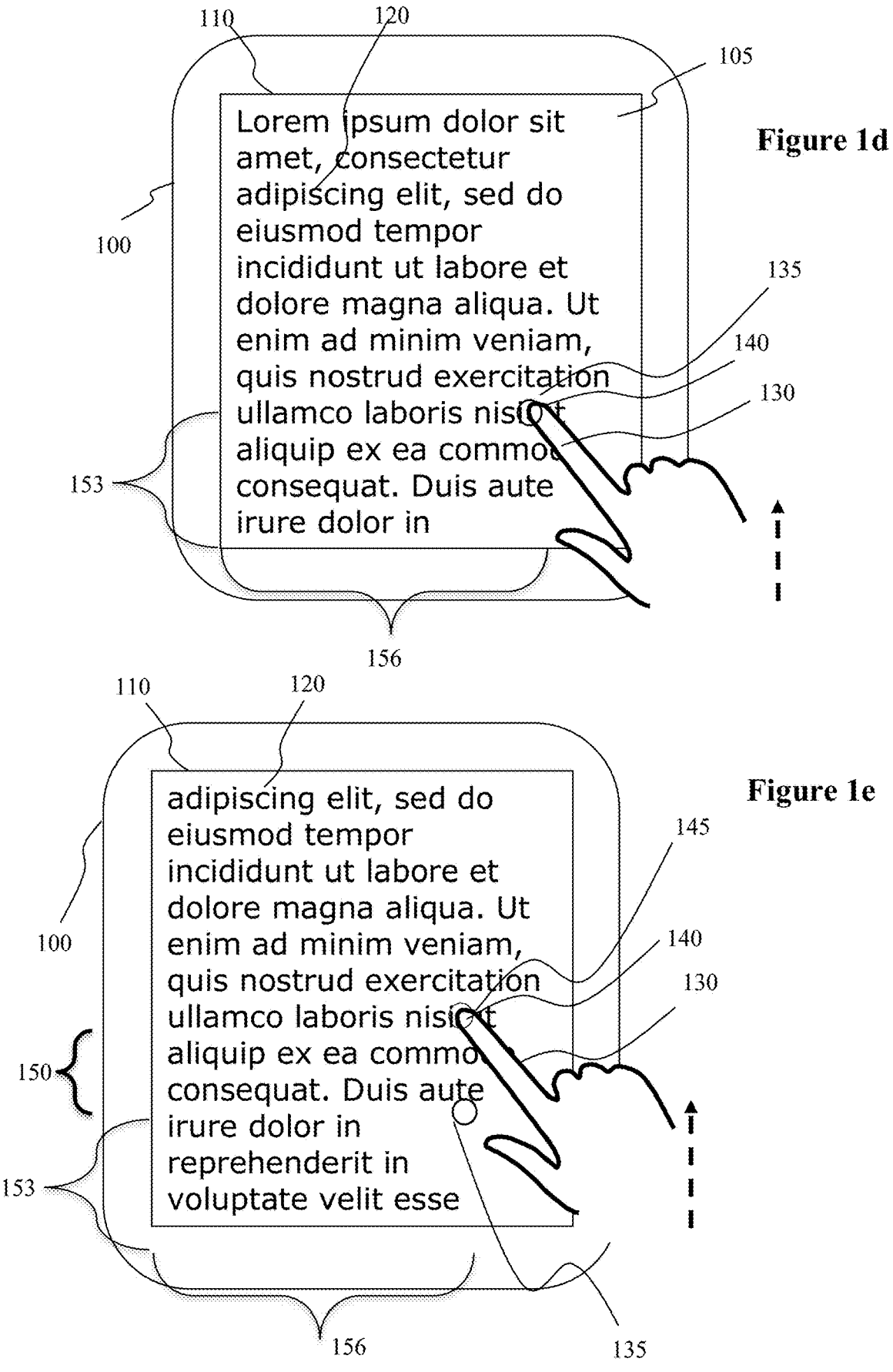
FIGS. 1*d*-1*g* illustrate a scrolling method according to a variation of the first embodiment of the invention, which variation determines "initial window location" at break-contact and includes using a touchscreen.

FIGS. 1*d*-1*e* illustrate an outcome of a pre-inertial scrolling user action. FIG. 1*d* shows a mobile computing device 100 (e.g., a tablet). Device 100 has touchscreen display 105, which displays window 110. Window 110 takes the entire space of display 105. Window 110 displays a first portion of document image 120. Document image 120 cannot be entirely displayed in window 110, and to view other parts of document image 120, the user employs input object 130, a finger, to scroll document image 120 up. The user performs a pre-inertial scrolling user action by using input object 130 and touching display 105. The user points at a window location 135 located higher (by distance 153) and to the right of (by distance 156) the bottom left corner of window 110. Window location 135 is displaying an area 140 of document image 120, approximately between the words "nisi" and "ut".

FIG. 1*e* shows window 110 displaying a second portion of document image 120 (partly overlapping with the first portion, shown in FIG. 1*d*). Displaying the second portion is caused by moving input object 130 up for distance 150, while keeping contact between display 105 and input object 130. As a result, document image 120 scrolls two lines up, so the top two lines of the first portion are no longer visible, and two new lines are displayed at the bottom of window

110. The scrolling from the first portion to the second portion is panning, during which input object 130 has uninterrupted contact with display 105.

FIG. 1*e* shows the moment just before the user breaks contact with display 105, a transition from a pre-inertial scrolling to an inertial scrolling. When input object 130 points to window location 145, located higher, by distance 150, than window location 135, the user breaks contact between input object 130 and display 105. Therefore, window location 145 is a window location that the user points to immediately before disengaging with the scrolled content (breaking contact with display 105), that is, "initial window location". Document area 140, displayed in the proximity of window location 145, becomes "initial pointed document area". Area 140 is defined as a circle with the center being the center of window location 145; the size of area 140 is approximately the size of the contact area between input object 130 (user's finger) and display 105 when the user touches display 105.

When the user breaks contact with display 105, performing an inertial scrolling user action, inertial scrolling starts. "Initial pointed document area" 140 is highlighted with a highlighting visual artifact, for instance, a yellow circle of substantially the size of initial pointed document area 140, which may make area 140 visually different from the rest of document image 120. After the inertial scrolling is initiated, document image 120 continues to scroll in the direction determined by the movement of input object 130. "Initial pointed document area" 140, which moves during the inertial scrolling as a part of document image 120, remains highlighted.

FIGS. 1*d*-1*e* describe the case when inertial scrolling is detected at substantially the moment when the user breaks contact with display 105. If inertial scrolling is not detected, e.g., when no further scrolling takes place when the user breaks contact with display 105, the document image displayed at the point of user's contact with the display immediately before the user breaks contact with the display does not become an "initial pointed document area"

Figure 1F:
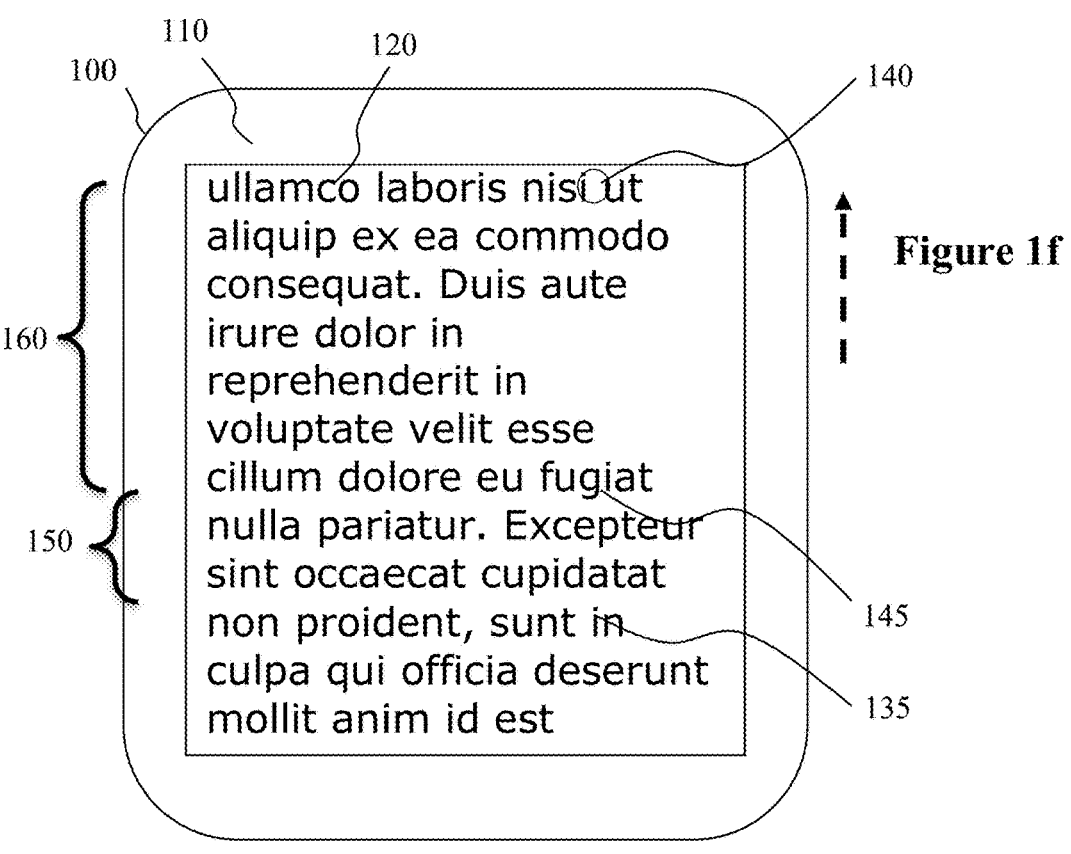

FIG. 1*f* shows window 110 displaying the third portion of document image 120 (which portion is partly overlapping with the first and the second portions shown in FIGS. 1*d* and 1*e*). The document image displayed in window 110 is the result of inertial scrolling of document image 120 towards the top border of window 110 by distance 160 (approximately 6 lines of text) compared to the view of document image 120 at the moment when initial scrolling was initiated (FIG. 1*e*). The inertial scrolling stops after document image 120 moves up for distance 160, and initial pointed document area 140 substantially reaches the top border of window 110. To indicate the stop of the scrolling, the highlighting visual cue (a yellow circle of approximately the size of area 140) changes its shape as if it "bumps" into the window border, temporarily flattens, and then restores its shape. The highlighting of initial pointed document area 140 is disabled after the inertial scrolling stops. The highlighting is disabled either immediately or after a delay.

Figure 1G:
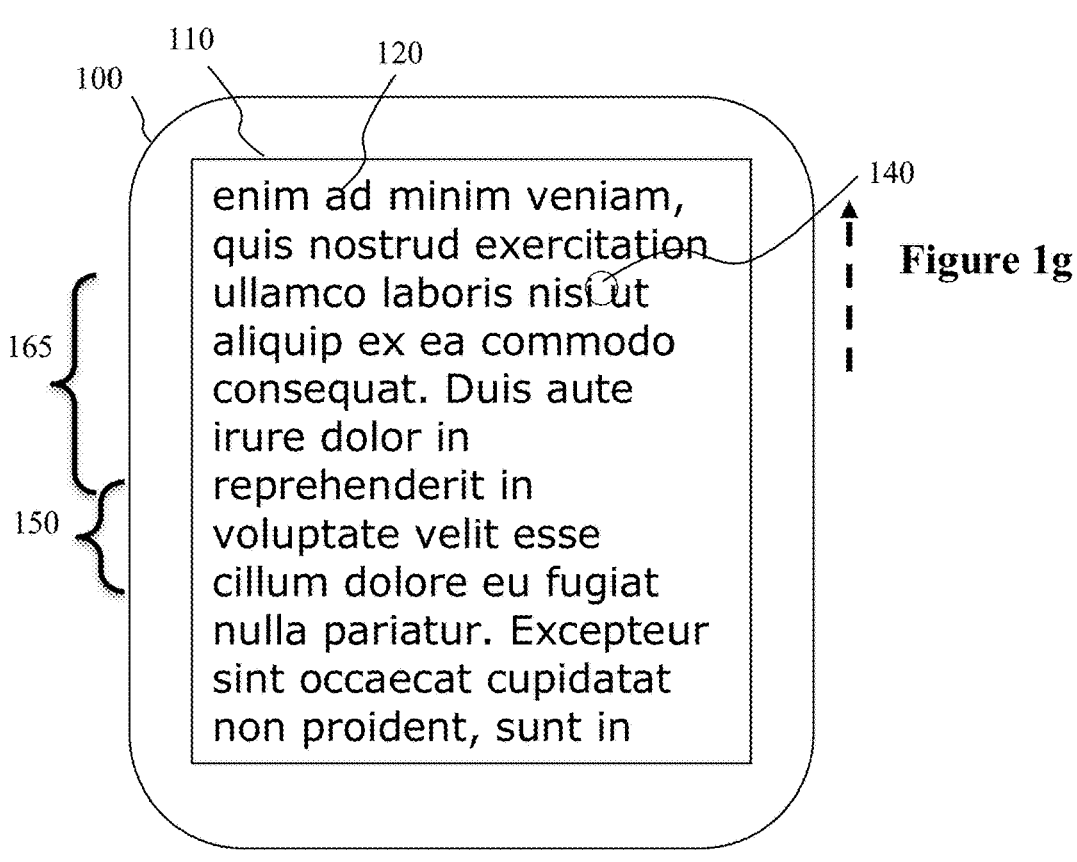

FIG. 1*g* shows a potential result of inertial scrolling according to the first embodiment, which is different from the one depicted in FIG. 1*f*. FIG. 1*g* shows a view of window 110, in which the inertial scrolling initiated at the moment shown in FIG. 1*e*, slows down and stops before area 140 reaches the top border of window 110 because user's scrolling action, initiated the inertial scrolling, has not been forceful enough.

Therefore, according to the first embodiment, disclosed above and illustrated by FIGS. 1*d*-1*g*, the distance, for which a document scrolls during inertial scrolling, is limited by the distance between the window location of "initial pointed document area" at the moment when the inertial scrolling starts (e.g., break-contact), and the window border in the direction of inertial scrolling. The actual scrolling distance can be smaller: in case of less forceful scrolling user actions, inertial scrolling may stop before an "initial pointed document area" reaches a window border (as it is shown in FIG. 1*g*).

In the above disclosure of the first preferred embodiment, an inertial scrolling user action is considered to be performed when the user disengages from the scrolled content (e.g., breaks contact with the display). It illustrates the approach of detecting an inertial scrolling user action that involves: (a) detecting a moment when the user disengages from a scrolled content (e.g., breaks contact with a touch-screen or other input device, let go of a scroll wheel, increases the distance between a touchscreen or other input device and an input object such as a finger, etc.), and (b) determining that the parameters of scrolling (e.g., its speed or direction) and the scrolled content (e.g., whether there is space for further scrolling) at the moment of the disengagement enable further scrolling of the content.

Alternatively, a pre-inertial scrolling user action (e.g., as depicted in FIG. 1*d*) can be considered as the first part of a two-part inertial scrolling user action. In that case the start of a pre-inertial scrolling action can be retrospectively considered a start of an inertial scrolling user action if followed by an inertial scrolling after the user disengages from the scrolled content. Such redefinition of inertial scrolling user actions, while suggesting an alternative way of detecting an inertial scrolling user action, would be consistent with the disclosure of the first embodiment, illustrated by FIGS. 1*d*-1*g*. An "initial pointed document area", as a document area pointed at/contacted by the user when an inertial scrolling user action is detected, would be defined as the area displayed in window location 135 (FIG. 1*d*) rather than in window location 145 (FIG. 1*e*). However, it would be the same document area 140, so the inertial scrolling distance depicted in FIGS. 1*d*-1*g* would be exactly the same.

First Variation of the First Embodiment

The first variation of the first embodiment is an inertial scrolling, which, once initiated, does not stop until an "initial pointed document area" reaches a window border. Even a small-effort scrolling user action, if it is sufficient to produce an inertial scrolling, will cause a document to scroll for substantially the distance between the window location of "initial pointed document area" at the moment when the inertial scrolling starts, and the window border in the direction of inertial scrolling. Inertial scrolling according to the first variation can be implemented with various parameters, such as speed and acceleration/deceleration.

Second Variation of the First Embodiment

The second variation of the first embodiment discloses inertial scrolling, whose distance may or may not be limited to the distance between (a) the window location of "initial pointed document area" at the moment when the inertial scrolling starts (that is, substantially the "initial window location"), and (b) the window border in the direction of inertial scrolling. The second variation is different in that, depending on the forcefulness of a scrolling user action (e.g., speed, acceleration, abruptness, pressure of the input object against the input device), an inertial scrolling may or may not continue after an "initial pointed document area" reaches a window border. According to the second variation of the first embodiment, while less forceful scrolling user actions may result in inertial scrolling similar to that illustrated by FIGS. 1*d*-1*g*, more forceful scrolling user actions may result in an inertial scrolling, not limited to the distance between "initial window location" (that is, substantially, the window location of "initial pointed document area" at the moment when the inertial scrolling starts) and the window border in the direction of inertial scrolling.

Figure 2A:
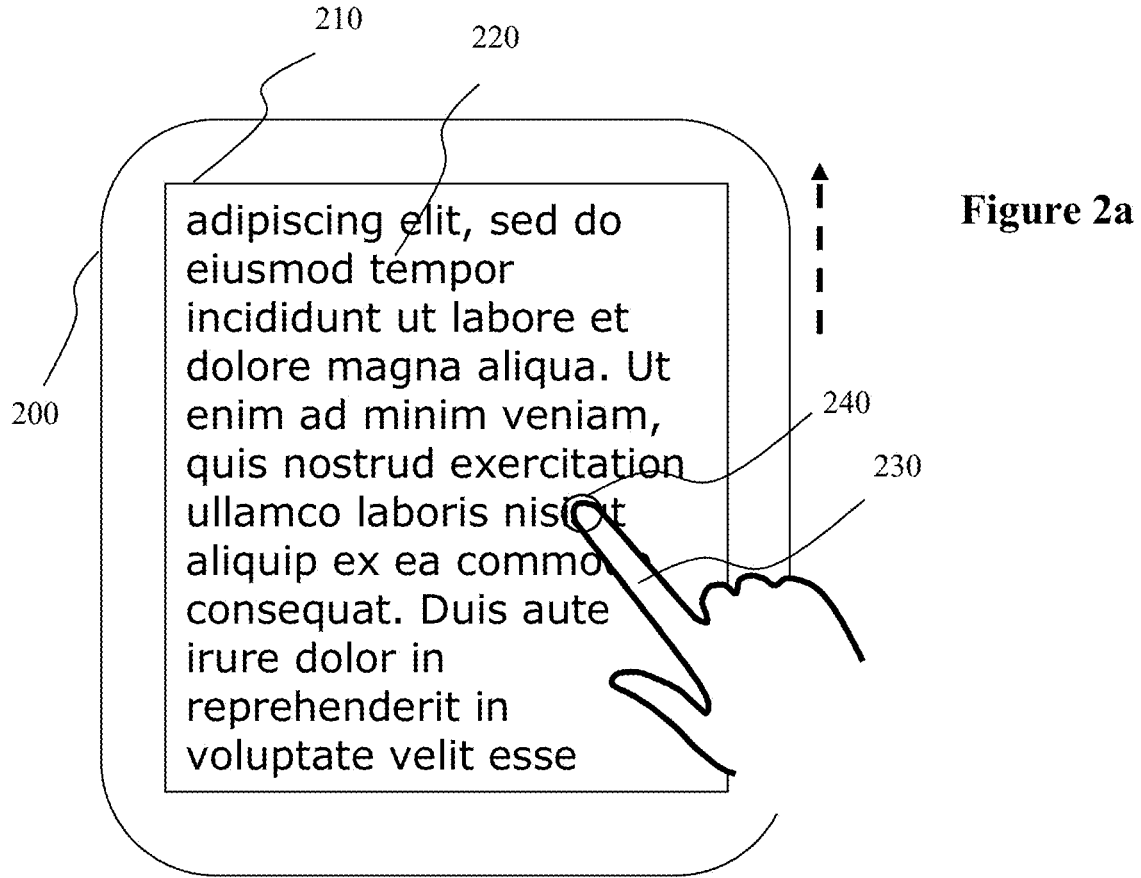
FIGS. 2*a*-2*b* illustrate a scrolling method according to the second variation of the first embodiment of the invention, which determines "initial window location" at break-contact, includes using a touchscreen, and selectively enables limiting inertial scrolling distance based on the forcefulness of a scrolling user action.
Figure 2B:
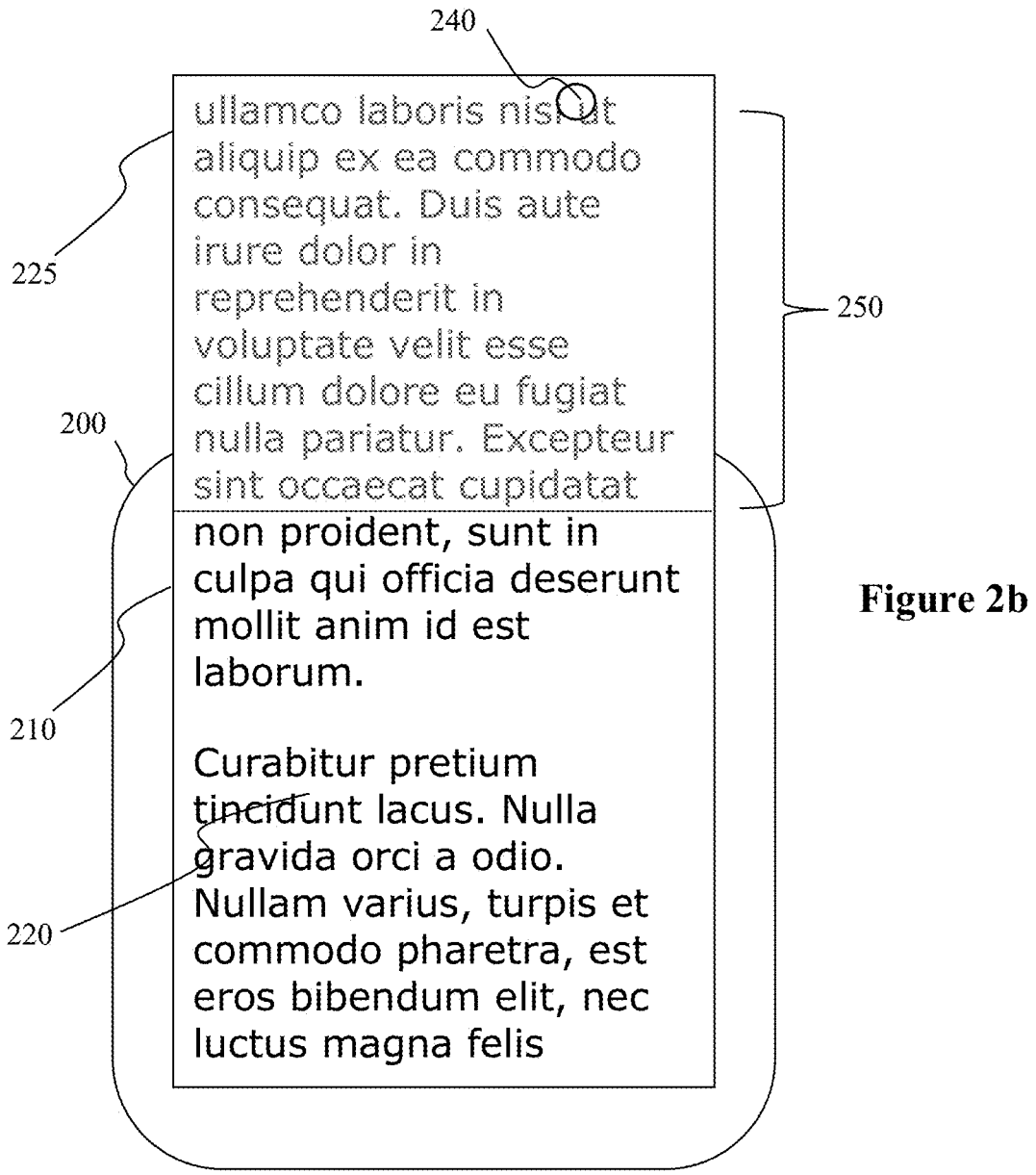

FIG. 2*a* shows the moment of initiating an inertial scrolling by the user of touchscreen device 200 showing document image 220 in window 210. The user breaks contact with touchscreen device 200 by lifting input object 230 (which is shown as user's finger) at a window location (initial window location") that shows "initial pointed document area" 240. The forcefulness of the inertial scrolling action is determined by the speed of input object 230 at the moment of breaking contact with device 200. In turn, the forcefulness of the inertial scrolling action determines the speed of the inertial scrolling, and, in particular, the speed of "initial pointed document area" 240 at the moment, when "initial pointed document area" 240 reaches the top border of window 210. If the speed does not exceed a predetermined speed value, "initial pointed document area" 240 stops at the border and the inertial scrolling of document image 220 ends. If the speed exceeds a predetermined speed, document image 220 continues to scroll for additional distance 250 after "initial pointed document area" 240 moves beyond the limits of window 210 (FIG. 2*b*).

The second variation can be implemented to selectively enable scroll limitation depending on the inferred scrolling distance. Specifically, when an inertial scrolling user action is detected:

detecting at least an attribute of said inertial scrolling, said at least an attribute detected at the moment when an inertial scrolling is initiated by the user, said at least an attribute selected from a group comprising at least: speed of the input object, speed of said inertial scrolling, acceleration of the input object, acceleration of said inertial scrolling, anticipated deceleration of said inertial scrolling of said document and pressure of said input object against the display; and inferring an anticipated distance, for which a document displayed in said window would scroll if a distance of said document scrolling would not be limited to substantially a distance between said "initial window location" and a border of said display window in the direction of said inertial scrolling; and if the inferred distance is greater than a distance between "initial pointed document area" and a border of said window in a direction of said scrolling, and a difference between said distances is not greater than a first predetermined value, then perform inertial scrolling of said document in said window for a distance equal to a distance between "initial pointed document area" and said border of said window in the direction of said scrolling, and if the inferred distance is greater than a distance between "initial pointed document area" and a border of said window in a direction of said scrolling, and a difference between said distances is greater than a first predetermined value, then perform inertial scrolling of said document in said window for a distance equal to said inferred distance.

Other Variations of the First Embodiment

Various other variations of the first embodiment are obvious to those skilled in the art and are covered by the present invention:

the document can be scrolled in any direction: vertical (up, down), horizontal (left, right), or a direction having both a vertical and a horizontal component, initial pointed document area may or may not be highlighted, visual effects indicating that initial pointed document area has reached a window border may or may not be used; if they are used, various types of visual effects can be employed, the panning (pre-kinetic) phase of the scrolling illustrated in FIG. 1 may be larger or smaller compared to the kinetic phase, and in some cases the panning phase may be negligible, an ongoing inertial scrolling can be stopped, or a new scrolling action can be initiated, if a user performs a user action using an input device (e.g., touches the display) before an "initial pointed document area" reaches a border of the window, an inertial scrolling may be stopped when different parts of an "initial pointed document area", for instance, its center point or an outer edge, reach a border of the window, or an "initial pointed document area" may stop at a certain distance before reaching the border.

In addition, "initial pointed document area" may have various sizes and shapes. For instance, the size of such an area may be defined as having approximately the size of the tip of an input object. The size can be defined adaptively and can positively correlate with the size of the detected contact area characteristic of a certain input object (it can be larger, for instance, for fingers than styluses, and be different for fingers of different users). The shape of an initial pointed document area may be a standard shape (such as a circle) or an approximation of the actual contact area between the input object and the display. A guideline for deciding upon the size of an "initial pointed document area" may be choosing a smallest area, which can still be clearly visible when a highlighting visual cue is enabled.

The distance, for which inertial scrolling continues according to the first embodiment, can be calculated in different ways obvious to those skilled in the art. It can be calculated not only as a distance between two window locations. (a) "initial window location", and (b) the window border in the direction of scrolling but also as a distance between two locations of the document image at break-contact. (a) "initial pointed document area" and (b) the document image area proximate to window border in the direction of scrolling at the beginning of inertial scrolling. Furthermore, it can be calculated as a distance between two display locations: (a) a display location of the area where the user breaks contact with the display at the beginning of inertial scrolling, and (b) display location of the window border in the direction of scrolling. Finally, inertial scrolling may stop when the distance between "initial pointed document area" and a window border becomes less than a predetermined value, so that the distance of inertial scrolling is not calculated in advance but rather determined on a moment-to-moment basis by substantially continuously monitoring relative positions (display locations, window locations, or document image locations) of "initial pointed document area" and window borders.

A variation of the first embodiment is also document scrolling achieved by the user by performing a mid-air scrolling gesture over the surface of a screen without touching the screen. In this case the "initial window location" is the window location that the user explicitly or implicitly points to at the moment when an inertial scrolling is initiated by the user. An inertial scrolling can be initiated, for instance, by rapidly increasing the distance between the display and the input object (such as user's fingers). An "initial window location" can be the area of the window in closest proximity to the scroll object, such as user's finger or fingers, stylus, and so forth.

Using a separate touch sensitive input device, isomorphic to the display, is yet another variation of the first embodiment. If locations of a touch sensitive input device are mapped to locations of a display (for instance, if the surface of the input device is placed on a flip side of a display, that is, the surface of a back side of an electronic product, opposite to the display, serves as touch sensitive input) then multitouch gestures on the input device have similar effects as multi touch gestures on touch sensitive display, shown in FIGS. 1*d-g.*

While the first embodiment is specific to touchscreen input, other embodiments addressing different input modalities, such as touch pads or scroll wheels, are described separately herein. These are not variations of the first embodiment, but rather alternative embodiments.

Second Embodiment of the Invention

Figure 3A:
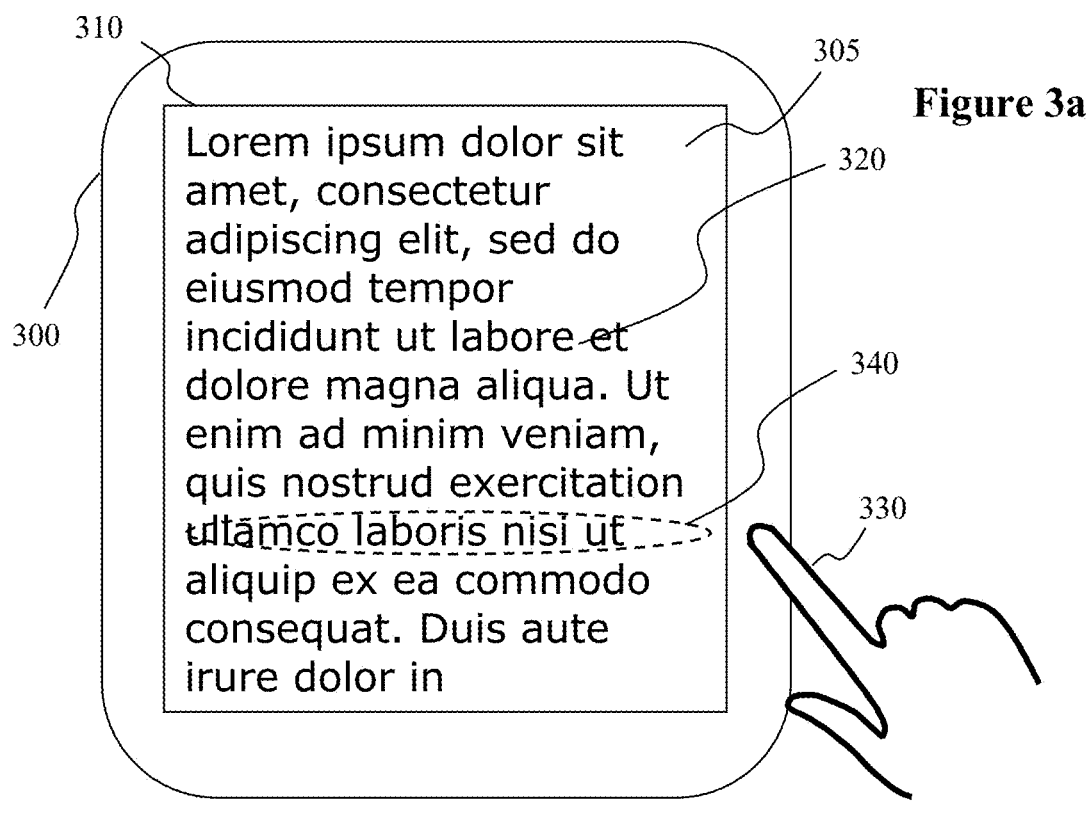
FIGS. 3*a*-3*c* illustrate a scrolling method according to the second embodiment of the invention, which determines "initial window location" at break-contact and includes using an area outside display for scrolling input.
Figure 3B:
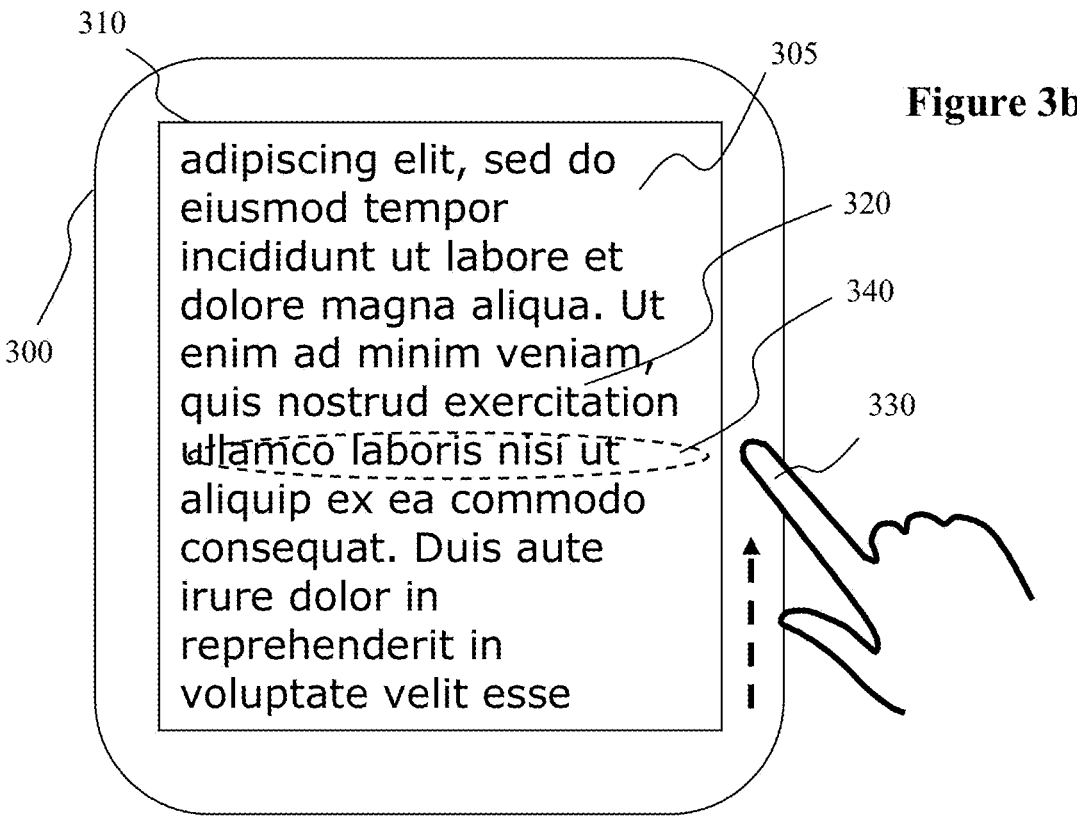

FIG. 3 shows the second embodiment of the invention. The embodiment is different from the first embodiment as it provides a unidimensional scrolling input device or devices placed just outside the display, e.g., along the right vertical border, which devices are used without the user directly pointing to a scrolled content. In FIG. 3, the "initial pointed document area" is shown as determined based on the document displayed at "initial window location". In the context of the second embodiment "initial window location" is the window location (vertical or horizontal) corresponding to the point of the input device, where the user breaks contact with the input device, starting inertial scrolling.

There is substantially a one-to-one correspondence between the coordinates of said input device and coordinates of the display according to one dimension (either vertical or horizontal). For instance, an input device located along the right vertical border of a display can be of the same height as the display and placed at the same level as the display, so that a point, selected on the input device, would directly correspond to a horizontal line of the display image immediately to the left of the selected input device point. Accordingly, an "initial window location" and an "initial pointed document area", as opposed to the first embodiment, are defined by only one coordinate (only horizontal or only vertical), and the size of "initial pointed document area" may take up to an entire height or width of the display.

Figure 3C:
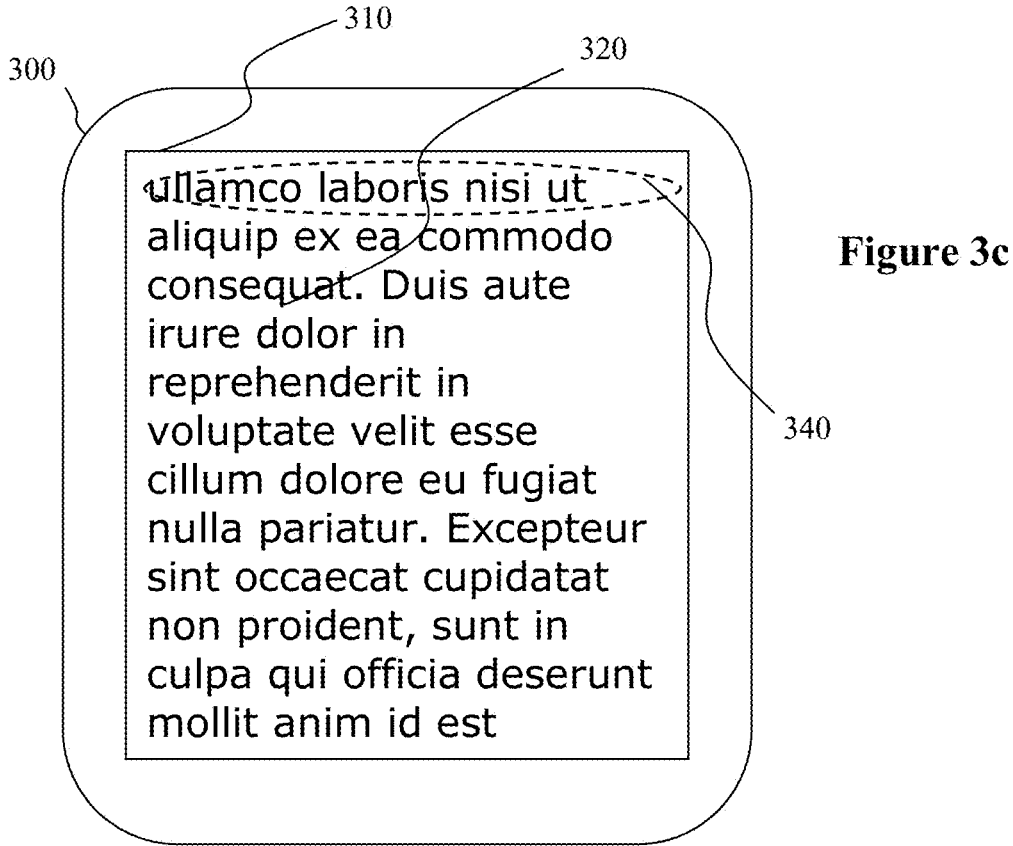

Electronic device 300 includes display 305 comprising window 310. Window 310 displays a first portion of document image 320. Document image 320 can be scrolled vertically or horizontally by sliding input object 330 along a side of device 300, outside display 305. When the user, after sliding input object 330 vertically up along the right side of device 300 (FIG. 3*a*), breaks contact with device 300 (FIG. 3*b*), inertial scrolling of document image 320 is initiated. A horizontal area 340 of document image 320 displayed at substantially the level of the vertical dimension of window 310, corresponding to the location of input object 330 at the moment when input object 330 breaks contact with device 300, is selected as "initial pointed document area". Area 340 may be highlighted with a highlighting visual cue, such as, for instance, a yellow ellipse. FIG. 3*c* shows the end moment of the inertial scrolling. The scrolling ends when area 340 reaches the top border of window 310.

It is understood that various obvious modifications of the second embodiment are possible. In particular, area 340 can be defined as a window-wide area or an area having a limited horizontal dimension, and the highlighting cue highlighting area 340 may have a variety of shapes, sizes, and colors, such as an elongated ellipse shown in FIG. 3 or a small circle displayed on a margin of document image 320.

DETAILED DESCRIPTION OF THE INVENTION

Part B: Newly Claimed (Including Previously Disclosed) Subject Matter

Third Embodiment of the Invention

Figures 4A, 4B:
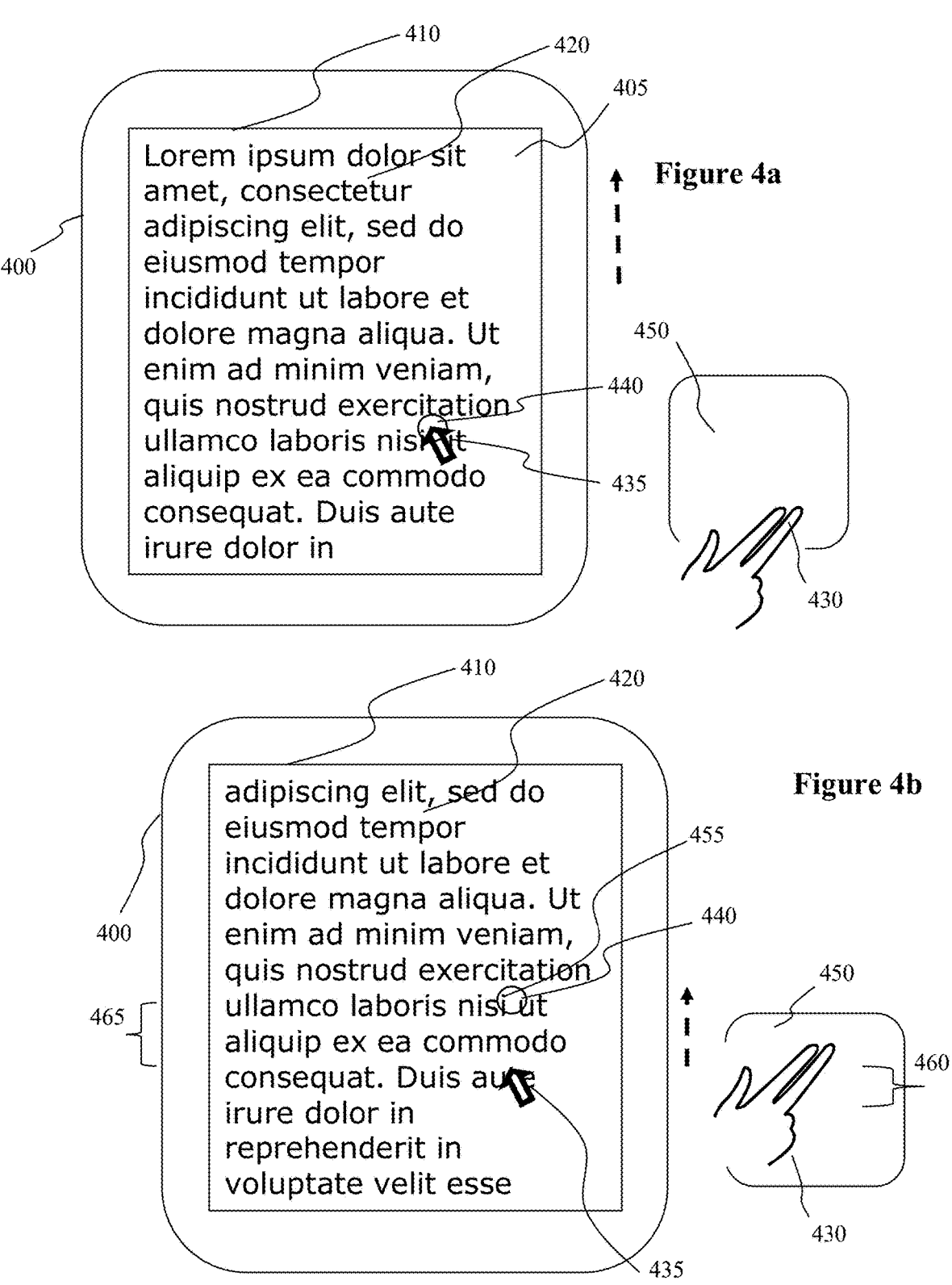
FIGS. 4*a*-4*c* illustrate a scrolling method according to the third embodiment of the invention, which involves a pointer-based implementation and determines "initial window location", as well as "initial pointed document area", at establish-contact and includes using a touch pad for scrolling and screen pointer control.
Figure 4C:
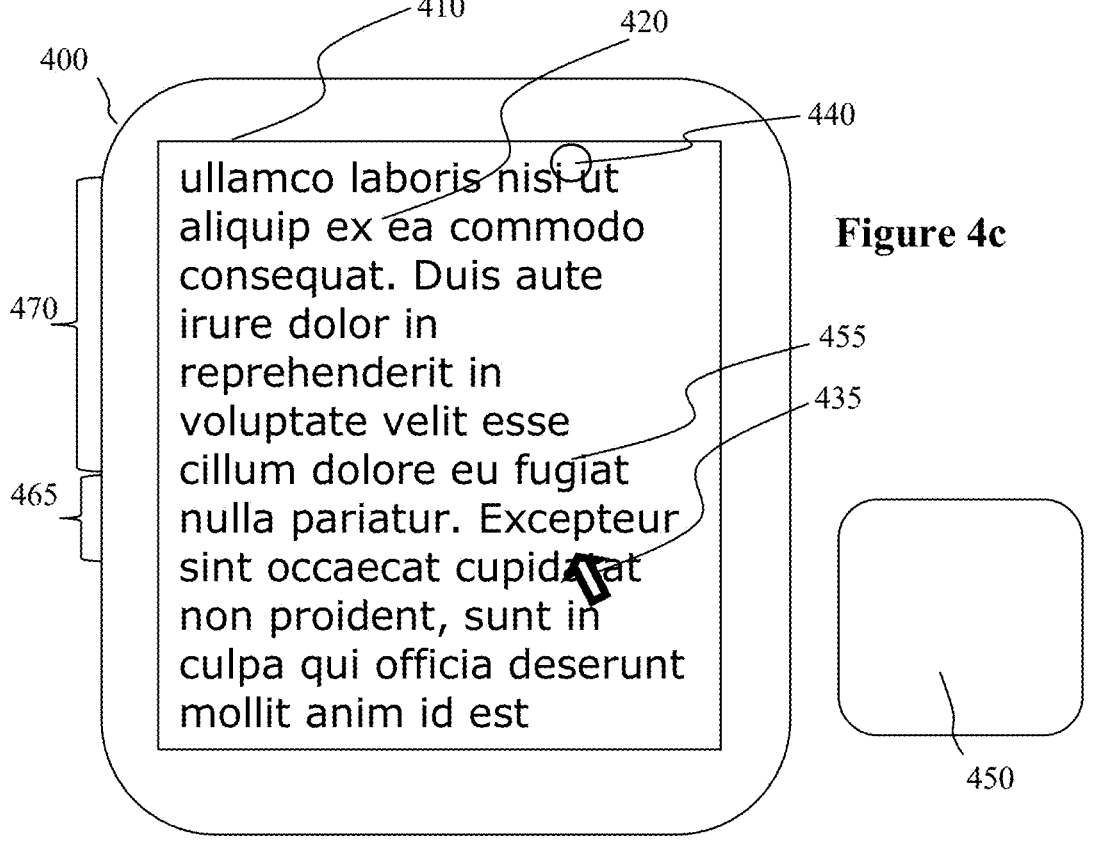

FIGS. 4*a-c* illustrate the third embodiment of the invention, which relates to an inertial scrolling caused by using a separate input device, a touch pad. In the context of the third embodiment, the "initial window location" is an establish-contact location, that is, the location of screen pointer at the moment of establishing contact with the input device (i.e., when initiating a pre-inertial scrolling user action). The document area displayed at the establish-contact moment at the "initial window location" (the establish-contact location) is tentatively recorded as an "initial pointed document area". In the context of the third embodiment, after the area has been recorded as a candidate "initial pointed document area", "initial window location" may not necessarily be used for determining the distance of eventual inertial scrolling.

While the discussion of the third embodiment specifically refers to "window locations" when determining the distance of inertial scrolling, the window locations (as discussed above in relation to the first embodiment) can be converted, in a way obvious to those skilled in the art, to document image locations or display locations, e.g., a distance between two locations of the document image at break-contact. (a) "initial pointed document area" and (b) the document image area proximate to window border in the direction of scrolling at the beginning of inertial scrolling, or a distance between two display locations: (a) a display location of "initial pointed document area" when the user breaks contact with the input device, and (b) display location of the window border in the direction of scrolling. Finally, inertial scrolling may stop when the distance between "initial pointed document area" and a window border becomes less than a predetermined value, so that the distance of inertial scrolling is determined through assessing relative positions (in terms of display locations, window locations, or document image locations) of "initial pointed document area" and window borders.

FIG. 4*a* shows electronic device 400, which has display 405 showing window 410. Window 410 displays a first portion of document image 420. Screen pointer 435 is also shown in window 410. Document image 420 can be scrolled in window 410 by sliding input object 430 (e.g., two fingers) over touch pad 450, which is a separate component of device 400, different from display 405. FIG. 4*a* shows the initial moment of a scrolling action (the beginning of a pre-inertial scrolling user action) when the user places input object 430 on touch pad 450 and is about to move input object 430 up to cause document image 420 scroll up. At this moment, screen pointer 435 points to area 440 of document image 420, which area is located in the upper part of the $4^{th}$ line from bottom, generally between "nisi" and "ut". The location of screen pointer 435 at this establish-contact moment, "initial window location", is the location where area 440 marked on FIG. 4b with a small circle displayed. Area 440 is recorded as a candidate "initial pointed document area".

FIG. 4b shows window 410 displaying a second portion of document image 420. The second portion is produced by moving input object 430 up for distance 460 while continuously keeping contact of input object 430 with touch pad 450. As a result, document image 420, along with area 440, has scrolled for distance 465, for two lines up, so the top two lines of the first portion are no longer visible, and two new lines are displayed at the bottom of window 410. During the scrolling from the first portion to the second portion, input object 430 has uninterrupted contact with touch pad 450.

FIG. 4b shows a transition from pre-inertial panning to inertial scrolling. The user breaks contact between input object 430 and touch pad 450. At this point area 440 is displayed at window location 455. After the user breaks contact between input object 430 and touch pad 450, document image 420 continues to scroll up, in the direction determined by the movement of input object 430. The direction of the scrolling may or may be the direction of the input object movement. Since an inertial scrolling is detected after the break-contact, area 440 is marked as an actual, rather than candidate, "initial pointed document area". Area 440 moves up from location 455 toward the top border of window 410. Area 440 is highlighted with a highlighting visual artifact, a small semitransparent circle, visually different from document image 420. Area 440, which moves along with the inertial scrolling as a part of document image 420, remains highlighted during inertial scrolling.

FIG. 4c shows window 410 displaying the third portion of document image 420. The document image displayed in window 410 is the result of inertial scrolling of the second portion of document image 420 towards the top border of window 410 for approximately six lines of text. The inertial scrolling stops when "initial pointed document area" 440 substantially reaches the top border of window 410. To indicate the stop of inertial scrolling, the highlighting visual cue (e.g., a yellow circle) changes its shape as if it "bumps" into the window border, temporarily flattens, and then restores its shape. The highlighting of "initial pointed document area" 440 is disabled after the inertial scrolling stops. The highlighting visual cue may be disabled immediately, after a delay, or in a fade-away manner.

FIG. 4 shows a case when a screen pointer does not move, maintaining its window location throughout the scrolling depicted in FIG. 4. This case can be expected to be normally happening in most circumstances, particularly because of an apparent difficulty for a user to simultaneously control a screen pointer and perform scrolling. If a screen pointer does move during an inertial scrolling, such events may be handled in various ways. For instance, screen pointer movement after an inertial scrolling is initiated may have no effect on the already started inertial scrolling. Alternatively, such movement may result in the termination of the ongoing inertial scrolling.

As shown in FIG. 4c, the total scrolling distance of "initial pointed document area", defined as document area initially displayed at establish-contact window location, is a sum of two distances, a pre-inertial scrolling distance 465 (from screen pointer location 435 to break-contact location 455) and inertial scrolling distance 470 (from break-contact location 455 to top window border).

It should be noted that when a pre-inertial scrolling user action is initiated at establish-contact, it may or may not produce an inertial scrolling. For instance, the user may break contact with touch pad 450 after the panning slows down or stops, in which case no inertial scrolling will take place after the break-contact. Therefore, when the user makes initial contact with the input device (such as touch pad 450), the document area displayed in the window location of the pointer is recorded as a candidate "initial pointed document area". The area is retrospectively designated as an actual "initial pointed document area" if the subsequent break-contact is followed by an inertial scrolling. If not, the area is not designated as a candidate "initial pointed document area" any longer.

The third embodiment illustrates a method for assisting a user of an electronic device in viewing information on said electronic device, said electronic device having at least a processor, a memory storage storing computer-executable instructions, a display having an at least a window displaying a document, and a scrolling input device, said method comprising the method steps of displaying a first portion of a document in the display window;

detecting a scrolling user action initiated by establishing contact of an input object with said scrolling input device;

detecting one or more parameters of said scrolling user action, said one or more parameters selected from a group comprising at least a window location, contacted or pointed at by a user at a moment when said contact is established, a direction of a movement of said input object while keeping contact with said input device, speed of said movement of said input object while keeping contact with said input device, and duration of contact of said input object with said input device;

recording a document area displayed at "initial window location", a window location contacted or pointed at by a user at a moment of establishing said contact;

detecting a break-contact of said input object from said input device;

determining whether an inertial scrolling has occurred after said break-contact; and if an inertial scrolling is determined to have occurred, designating said recorded document area as an "initial pointed document area"; and detecting window location of said "initial pointed document area" at time of said break-contact; and performing inertial scrolling of the document to a second portion, while limiting a distance of the scrolling to substantially a distance between a window location of said "initial pointed document area" at a break-contact time and a border of the display window in the direction of said inertial scrolling.

The third embodiment presents a particular implementation of the above method, wherein an electronic device comprises a separate scrolling input device, the separate device being separate from the electronic device's display, and the display displays a screen pointer controlled by a user, and wherein an "initial pointed document area" is a document area displayed at a window location of the screen pointer at the moment when the scrolling user action is initiated.

It is obvious to those skilled in the art that the description can be applied to a variety of other separate scrolling input devices, such as a scroll wheel. In addition, the third embodiment can be implemented to enable a window content to scroll beyond a window border in case of more forceful scrolling user actions (similarly to the second variation of the first embodiment illustrated by FIG. 2), The general method, illustrated by the third embodiment, can be implemented in touchscreen-based systems. In such systems, the document area in the proximity of the user's initial contact with the touchscreen is recorded, and if the subsequent break contact is followed by the document's inertial scrolling, the recorded area is retrospectively designated an "initial pointed document area". This method is a particular case of the general method described earlier in this section, wherein an electronic device comprises a touch-sensitive display, the touch-sensitive display being a display, at least part of which display serving as a sensing input device and the "initial pointed document area" being a document area displayed at a location of a the touch-sensitive display contacted by a user when the respective scrolling user action is initiated.

Additionally, the following variations of the third embodiment are obvious to those skilled in the art:

the document can be scrolled in any direction: vertical (up, down), horizontal (left, right), or a direction having both a vertical and a horizontal component, "initial pointed document area", as well as candidate "initial pointed document area", may or may not be highlighted, visual effects indicating that initial pointed document area has reached a window border may or may not be used; if they are used, various types of visual effects can be employed, the panning (pre-kinetic) phase of the scrolling may be larger or smaller compared to the kinetic phase, and in some cases the panning phase may be negligible, an ongoing inertial scrolling can be stopped, or a new scrolling action can be initiated, if a user performs a user action using an input device before an "initial pointed document area" reaches a border of the window, an inertial scrolling may be stopped when different parts of an "initial pointed document area", for instance, its center point or an outer edge, reach a border of the window, or an "initial pointed document area" may stop at a certain distance before reaching the border.

In addition, "initial pointed document area" may have various sizes and shapes, e.g., a standard shape (such as a circle). A guideline for deciding upon the size of an "initial pointed document area" may be choosing a smallest area, which can still be clearly visible when a highlighting visual cue is enabled.

Figures 5A, 5B:
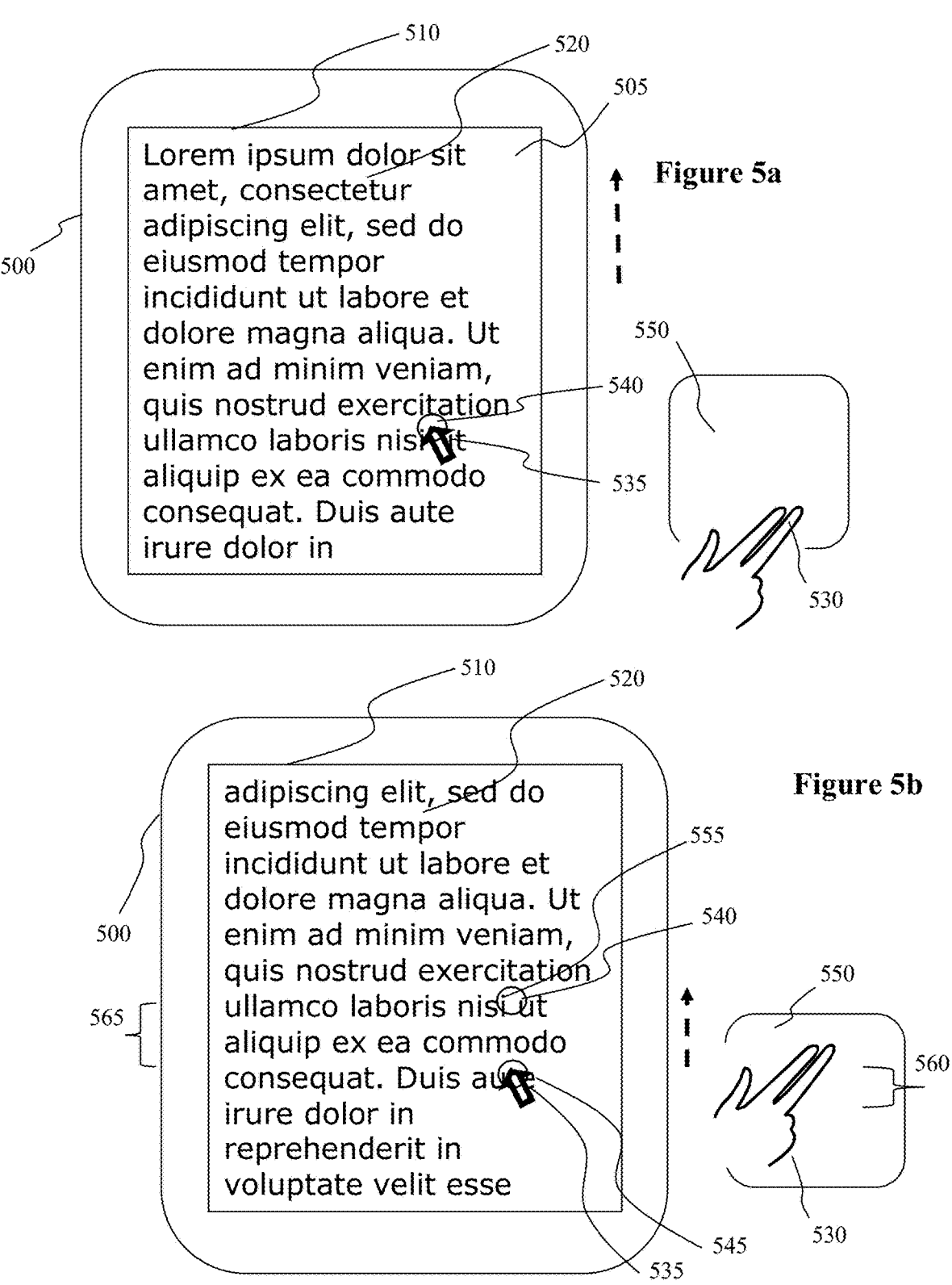

If "initial pointed document area" were defined as document area displayed at break-contact window location, inertial scrolling distance would be different, which is illustrated by FIG. 5. FIG. 5, by way of comparison, shows an embodiment in which "initial pointed document area" is defined as a document area initially displayed at break-contact location (i.e., if "initial window location" as in the first and second embodiments above, is defined as at break-contact window location). FIG. 5a shows electronic device 500, which has display 505 showing window 510. Window 510 displays a first portion of document image 520. Screen pointer 535 is also shown in window 510. Document image 520 can be scrolled in window 510 by sliding input object 530 (e.g., two fingers) over touch pad 550, which is a separate component of device 500, different from display 505. FIG. 5a shows the moment when the user places input object 530 on touch pad 550 and is about to move input object 530 up to cause document image 520 scroll up. At this moment, screen pointer 535 points to area 540 of document image 520, which area is located in the upper part of the 4$^{th}$ line from bottom, generally between "nisi" and "ut". According to the potential embodiment shown in FIG. 5, area 540 is NOT recorded as a candidate "initial pointed document area" and it is not visually marked.

FIG. 5b shows the end point of the pre-inertial user action initiated at the moment shown in FIG. 5a. The user breaks contact between input object 530 and touch pad 550 after scrolling up for distance 565 and document image 520 continues to scroll up. Since inertial scrolling is detected, document area 545, which is displayed at the window location of screen pointer 535 at the break-contact moment, is marked as "initial pointed document area" and is highlighted with a highlighting visual artifact. Area 545 is located lower than area 540 by distance 565.

FIG. 5c shows the result of inertial scrolling of the second portion of document image 520 towards the top border of window 510. The inertial scrolling stops when initial pointed document area 545 substantially reaches the top border of window 510. The total scrolling distance of "initial pointed document area" 545, defined as document area displayed at break-contact window location, is a sum of two distances, pre-inertial scrolling distance 565 (from the location of screen pointer 535 to break-contact location 555) and inertial scrolling distance 575 (from screen pointer location 535 to top window border). This total scrolling distance is larger than the total scrolling distance shown in FIG. 4c. Since in pointer-based implementations the pointer position may not change during pre-inertial scrolling, the distance of inertial scrolling is increased by the distance of the pre-inertial scrolling compared to the distance of inertial scrolling shown in FIG. 4. The implementations shown in, respectively, FIG. 4 and FIG. 5, may have their respective advantages, and one of them may be preferable depending on particular types of users, technologies, documents, and use contexts.

Stopped Scrolling when End of Document Reached

In some implementations, the inertial scrolling may terminate before the initial pointed document area (IPDA) reaches the border of the display window in the direction of scrolling, and the document does not scroll for distance between a break-contact (alternatively, establish-contact) distance, if the document has reached an end in that direction. For example, if in scrolling upward the bottom of the document has been reached, further movement of the document would not be possible. While this case was not separately claimed in the parent application, it would be understood by a person of ordinary skill in the art based on the prior disclosure. This implementation detail is made explicit in the present application for purposes of clarity and completeness.

DETAILED DESCRIPTION OF THE INVENTION

Part C: Variations

The variations described in this section apply to both previously claimed and newly claimed subject matter.

According to all embodiments of the invention, the size, shape, color, brightness, transparency, and other attributes of the highlighting visual cue disclosed in the invention can be defined or selected by the user. The user may also select options and preferences, including enabling or disabling the visual cue, time thresholds, types of the visual cue, and a spatial offset between screen pointer location (alternatively, user contact point when using a touchscreen device) and a visual cue. For instance, the user may prefer a visual cue to be displayed on a margin of a document rather than overlaid on the content of a document.

While the scrolling input devices shown above are touch pad and touchscreen, it is obvious to those skilled in the art that many other types of devices can be used to perform scrolling actions, including, but limited to, scroll wheels, joysticks, trackpads, graphic tablets, are covered by the invention. In these cases, the direction and distance of scrolling are determined by the parameters of the user action, such as direction, distance, time, and speed, performed on a scroll wheel or other alternative scrolling input device.

In addition, while the example of a separate scrolling input device illustrated in the description above, a touch pad, can also be used for controlling the position of a screen pointer, it is understood that a separate scrolling input device in the context of this invention can have a more limited functionality, not including the control of a screen pointer. The use of such scrolling input devices can be combined with other devices, which can be used to control the position of a screen pointer.

The embodiments described above assume that the user does not resize the window when scrolling its content. If such user actions do happen, they may be handled in various ways. For instance, they may have no effect on the distance of already started inertial scrolling. Alternatively, such actions may result in the termination of the ongoing inertial scrolling.

Furthermore, while the figures above illustrate only one type of screen pointers, an arrow, it is understood that other types of screen pointers, including hand-shaped pointers, text cursors (e.g., short vertical or oblique lines), and so forth, are covered by the present invention.

It is understood that a window may display more graphical components, such as user interface elements or controls, which are not part of the scrollable content of the document displayed in the window, and which may affect the document's scrolling behavior by affecting the effective window borders of the scrollable window content and the responsiveness of certain window locations to scrolling user actions.

It is understood that the invention can be employed in network computing environments with various types of computer system configurations, including the use of cloud memory storage and distributed execution of computer executable instructions by configurations of processors.

It is understood that the invention is not limited to methods but may also be implemented as an apparatus. FIG. 6 illustrates, in schematic form, an example of an electronic device 600 adapted to perform inertial scrolling according to the present invention. The device 600 comprises at least a processor 620, a memory 630 storing computer-executable instructions, a display 640, and a scrolling input device 610. In some embodiments, the scrolling input device 610 is integrated with the display 640, forming a touch-sensitive display. In other embodiments, the scrolling input device 610 is separate from the display 640 and may be, for example, a touch pad, scroll wheel, joystick, or gesture sensor. In pointer-based embodiments, the device may further comprise a screen pointer input device 612, which is adapted to control a screen pointer displayed on the display 640.

In break-contact embodiments, the processor 620 is adapted to detect a scrolling user action and determine an initial window location as an area of the display window contacted or pointed at by the user immediately before breaking contact with the scrolling input device to initiate inertial scrolling. In establish-contact embodiments, the processor 620 is adapted to detect a scrolling user action initiated by establishing contact with the scrolling input device and to determine the initial window location as the location contacted or pointed at by the user at the moment of establishing contact. In the establish-contact embodiments, the processor 620 may record the document area displayed at the initial window location as a candidate initial pointed document area and retrospectively designate it as the initial pointed document area if the subsequent break-contact is followed by inertial scrolling.

In both embodiments, the processor 620, in conjunction with the memory 630, is adapted to execute instructions for designating a document area displayed substantially in the initial window location as the initial pointed document area; performing inertial scrolling in a direction determined by the scrolling user action; and limiting the distance of inertial scrolling to substantially a distance between the initial window location (or the window location of the initial pointed document area) and a border of the display window in the direction of scrolling. In some embodiments, the processor 620 further executes instructions for highlighting the initial pointed document area during inertial scrolling and disabling the highlight when the scrolling terminates.

The invention claimed is:

1. A method for assisting a user of an electronic device in viewing information on said electronic device, said electronic device having at least a processor, a memory storage storing computer-executable instructions, a display having an at least a window displaying a document, and a scrolling input device, said method comprising the method steps of
displaying a first portion of said document in said display window;
detecting an inertial scrolling user action initiated by a user, which scrolling user action detecting comprises at least detecting a direction of an inertial scrolling caused by said scrolling user action and detecting an "initial window location", said "initial window location" being an area of said display window, which area is contacted, or pointed at, by the user when breaking contact with said scrolling input device; and
performing an inertial scrolling of said document to a second portion of said document, while limiting a distance of said scrolling to substantially a distance between said "initial window location" and a border of said display window in the direction of said inertial scrolling.

2. The method of claim 1, further comprising the steps of detecting an "initial pointed document area", said "initial pointed document area" being a document image area, displayed substantially in said "initial window location" when said inertial scrolling action is initiated; and highlighting said "initial pointed document area" during said inertial scrolling caused by said inertial scrolling user action.

3. The method of claim 1, wherein said electronic device comprises a touch-sensitive display, said touch-sensitive display being a display, at least part of which display serving as a sensing input device, and said "initial window location" being a location of a said touch-sensitive display, which location is contacted by a user immediately before the user breaks contact with the display to initiate said inertial scrolling.

4. The method of claim 1, wherein said electronic device comprises a separate scrolling input device, said separate device being separate from said display, and said display displays a screen pointer controlled by a user, and wherein said "initial window location" is a window location of said screen pointer at a moment when said inertial scrolling is initiated by the user.

5. The method of claim 1, further comprising the steps of:

detecting at least an attribute of said inertial scrolling, said at least an attribute detected at the moment when said inertial scrolling is initiated by the user, said at least an attribute selected from a group comprising at least: speed of the input object, speed of said inertial scrolling, acceleration of the input object, acceleration of said inertial scrolling, anticipated deceleration of said inertial scrolling of said document and pressure of said input object against the display; and inferring an anticipated distance, for which said document displayed in said window would scroll if a distance of said document scrolling would not be limited to substantially a distance between said "initial window location" and said border of said display window in the direction of said inertial scrolling; and if said inferred distance is greater than said distance between said "initial window location" and said border of said window in the direction of said scrolling, and a difference between said inferred distance and said distance between said "initial window location" and said border of said window in the direction of said scrolling is not greater than a first predetermined value, then performing said inertial scrolling of said document in said window for a distance substantially equal to said distance between "initial window location" and said border of said window in the direction of said scrolling; and if said inferred distance is greater than a distance between "initial window location" and a border of said window in a direction of said scrolling, and a difference between said inferred distance and said distance between said "initial window location" and said border of said window in the direction of said scrolling is greater than the first predetermined value, then performing said inertial scrolling of said document in said window for a distance substantially equal to said inferred distance.

6. The method of claim 1, further comprising the steps of:

detecting an "initial pointed document area", said "initial pointed document area" being a document image area, displayed substantially in said "initial window location" when said inertial scrolling action is initiated;

detecting a speed, with which said document scrolls at a moment when said "initial pointed document area" reaches said border of said display window in the direction of said inertial scrolling; and limiting a distance of said inertial scrolling to substantially said distance between said "initial window location" and said border of said display window in the direction of said inertial scrolling only if said speed does not exceed a second predetermined value.

7. The method of claim 1, further comprising the step of detecting an "initial pointed document area", said "initial pointed document area" being a document image area, displayed substantially in said "initial window location" when said inertial scrolling action is initiated; and wherein said electronic device comprises at least a separate scrolling input device, said separate device being a unidimensional scrolling input device placed outside the display, said unidimensional scrolling input device being adapted to be used without the user directly pointing to a scrolled content, and wherein, an "initial pointed document area", is defined by only one coordinate.

8. The method of claim 1, further comprising the steps of detecting an "initial pointed document area", said "initial pointed document area" being a document image area, displayed substantially in said "initial window location" when said inertial scrolling action is initiated;

wherein in a first gesture said inertial scrolling continues until said "initial pointed document area" reaches said window border in the direction of said inertial scrolling, and wherein in a second gesture said inertial scrolling terminates before said "initial pointed document area" reaches said window border in the direction of said inertial scrolling.

9. The method of claim 1, further comprising the step of detecting an "initial pointed document area", said "initial pointed document area" being a document image area, displayed substantially in said "initial window location" when said inertial scrolling action is initiated; and wherein said inertial scrolling, once initiated, does not stop until said "initial pointed document area" reaches said border of said display window in the direction of said inertial scrolling.

10. The method of claim 1, wherein said inertial scrolling is terminated before said initial pointed document area reaches said border of said display window in the direction of said inertial scrolling, if said document has reached an end in said direction of scrolling.

11. The method of claim 1, wherein said inertial scrolling comprises scrolling said document in a direction having both a vertical component and a horizontal component.

12. An apparatus, comprising at least a processor; and a scrolling input device; and a display, adapted to display at least a window adapted to displaying at least a document; and a memory storage storing computer-executable instructions;

wherein said display, said processor, said memory storage, and said computer-executable instructions being adapted to perform the following displaying a first portion of said document in said display window; and detecting an inertial scrolling user action, which detecting comprises at least detecting a direction of an inertial scrolling caused by said inertial scrolling user action and detecting an "initial window location", said "initial window location" being an area of said display window pointed at by a user when breaking contact with said scrolling input device; and performing an inertial scrolling of said document to a second portion of said document; a distance of said document scrolling being limited to substantially a distance between said "initial window location" and a border of said display window in the direction of said inertial scrolling.

13. The apparatus of claim 12, wherein said display is a touch-sensitive display, said touch-sensitive display being a display, at least part of which also serves as a scrolling input device, and said processor, said touch-sensitive display, said memory storage, and said computer-executable instructions are further adapted to perform the following detecting a scrolling user action, said action being initiated by touching the display with a scrolling input object, such as a finger; and detecting an "initial window location" as a location of a point of a scrolling input object touch at a moment when the user breaks a contact of the scrolling input object and the display to initiate an inertial scrolling.

14. The apparatus of claim 12, wherein said scrolling input device is a device, separate from said display, and said display is adapted to display a screen pointer in said display window, and said apparatus further comprises a screen pointer input device, said screen pointer input device being adapted to control a screen location of said screen pointer, and said processor, said display, said scrolling input device, screen pointer input device, and said memory storage are adapted to detect an "initial window location" as a location pointed at by said screen pointer at a moment when an inertial scrolling is initiated by the user.

15. A method for assisting a user of an electronic device in viewing information on said electronic device, said electronic device having at least a processor, a memory storage storing computer-executable instructions, a display having an at least a window displaying a document, and a scrolling input device, said method comprising the method steps of displaying a first portion of a document in the display window;

detecting a scrolling user action initiated by establishing contact of an input object with said scrolling input device, detecting one or more parameters of said scrolling user action, said one or more parameters selected from a group comprising at least a window location, contacted or pointed at by a user at a moment when said contact is established, a direction of a movement of said input object while keeping contact with said input device, speed of said movement of said input object while keeping contact with said input device, and duration of contact of said input object with said input device;

recording a document area displayed at a window location, contacted or pointed at by a user at a moment when said contact is established;

detecting a break contact of said input object from said input device;

determining whether an inertial scrolling has occurred after said break-contact; and if an inertial scrolling is determined to have occurred, designating said document area as an "initial pointed document area"; and performing inertial scrolling of the document to a second portion, while limiting a distance of the scrolling to substantially a distance between the window location of said "initial pointed document area" at a break contact moment and a border of the display window in the direction of said inertial scrolling.

16. The method of claim 15, further comprising the steps of highlighting said "initial pointed document area" during said inertial scrolling caused by said inertial scrolling user action.

17. The method of claim 15, wherein said electronic device comprises a touch-sensitive display, said touch-sensitive display being a display, at least part of which display serving as a sensing input device and said "initial pointed document area" being a document area displayed at a location of a said touch-sensitive display contacted by a user when said scrolling user action is initiated.

18. The method of claim 15, wherein said electronic device comprises a separate scrolling input device, said separate device being separate from said display, and said display displays a screen pointer controlled by a user, and wherein said "initial pointed document area" is a document area displayed at a window location of said screen pointer at a moment when said scrolling user action is initiated.

19. The method of claim 15, further comprising the steps of:

inferring an anticipated distance of inertial scrolling, for which said document would scroll if a distance of said inertial scrolling would not be limited to substantially a distance between a window location of said "initial pointed document area" at the moment when said scrolling user action is initiated and said border of said display window in the direction of said inertial scrolling;

if said inferred distance is greater than said distance between said "initial pointed document area" and said border of said window in the direction of said scrolling, and a difference between said distances is not greater than a first predetermined value, then performing inertial scrolling of said document for a distance substantially limited to said distance between said "initial pointed document area" and said border of said window in the direction of said scrolling; and if said inferred distance is greater than said distance between said "initial pointed document area" and said border of said window in the direction of said scrolling, and a difference between said distances is greater than the first predetermined value, then performing inertial scrolling of said document for a distance substantially equal to said inferred distance.

20. The method of claim 15, wherein said inertial scrolling is terminated before said initial pointed document area reaches said border of said display window in the direction of said inertial scrolling, if said document has reached an end in said direction of scrolling.

\* \* \* \* \*